US012437984B2

(12) United States Patent
Stewart et al.

(10) Patent No.: US 12,437,984 B2
(45) Date of Patent: Oct. 7, 2025

(54) ION ACCUMULATION CONTROL FOR ANALYTICAL INSTRUMENT

(71) Applicant: Thermo Fisher Scientific (Bremen) GmbH, Bremen (DE)

(72) Inventors: Hamish Stewart, Bremen (DE); Alexander Makarov, Bremen (DE); Konstantin Ayzikov, Bremen (DE); Dmitry Grinfeld, Bremen (DE); Kyle Fort, Bremen (DE); Tabiwang Arrey, Bremen (DE); Matthias Biel, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 423 days.

(21) Appl. No.: 18/095,860

(22) Filed: Jan. 11, 2023

(65) Prior Publication Data

US 2023/0282471 A1 Sep. 7, 2023

(30) Foreign Application Priority Data

Jan. 10, 2022 (GB) ..................................... 2200225
Nov. 8, 2022 (GB) ..................................... 2216594

(51) Int. Cl.
*H01J 49/42* (2006.01)
*H01J 49/06* (2006.01)

(52) U.S. Cl.
CPC .......... *H01J 49/421* (2013.01); *H01J 49/062* (2013.01); *H01J 49/4265* (2013.01)

(58) Field of Classification Search
USPC .......................................................... 250/282
See application file for complete search history.

(56) References Cited

U.S. PATENT DOCUMENTS

2008/0070314 A1* 3/2008 Geromanos ......... H01J 49/0431 436/161
2024/0234114 A1* 7/2024 Stewart ................. H01J 49/426

* cited by examiner

*Primary Examiner* — Kiet T Nguyen
(74) *Attorney, Agent, or Firm* — ALG Intellectual Property, LLC

(57) ABSTRACT

A method of operating an instrument which comprises a first and second ion stores, comprising determining whether a target accumulation time for the second ion store is greater than a threshold accumulation time. When the target accumulation time is less than the threshold accumulation time, ions are accumulated within the second ion store using an accumulation time that is based on the target accumulation time. When the target accumulation time is greater than the threshold accumulation time, ions are accumulated within the first ion store using a first accumulation time that is based on a difference between the target accumulation time and the threshold accumulation time, the ions accumulated in the first ion store are passed to the second ion store, and further ions are accumulated within the second ion store using a second accumulation time that is based on the threshold accumulation time.

20 Claims, 10 Drawing Sheets

ION ACCUMULATION CONTROL FOR ANALYTICAL INSTRUMENT

FIELD OF THE INVENTION

The present invention relates to the field of mass spectrometry, particularly methods of mass spectrometry in which ions are accumulated in an ion trap, such as Fourier Transform (FT) mass spectrometry using electrostatic traps such as electrostatic orbital traps.

Background

Many types of mass spectrometer employ ion traps. For example, Orbitrap™ instruments from Thermo Fisher Scientific employ a curved linear ion trap ("C-Trap") together with an electrostatic orbital trap to provide high-resolution accurate mass analysis. The C-Trap and the electrostatic orbital trap are provided downstream of an ion source, whereby ions are transmitted to the C-Trap (and from there to the electrostatic orbital trap) via various ion optical devices arranged between the ion source and the C-Trap.

It is often necessary to precisely control the total number of ions accumulated in an ion trap, for example to optimise the number of ions to be below, but as close as possible to, a limit for the ion trap such as a space-charge limit for the ion trap. The number of ions accumulated in an ion trap is in turn controlled by use of a gate to control the accumulation time (e.g., fill time) of ions into the trap. In commercial instruments, a relatively sophisticated and fast ion gate may be provided to enable sufficiently precise control of the accumulation time into the trap.

Modern mass spectrometers operate with ever faster repetition rates, allowing high performance over shorter experiments and a greater number of samples to be processed. Typically, the main constraints on repetition rate are instrument sensitivity, as a certain accumulation time is often required to gather sufficient sample ions for analysis, the time required to process these ions for analysis, the analysis time itself, and/or the time required for electronics to switch between analyte targets.

It is believed that there remains scope for improvements to apparatus and methods for mass analysis.

SUMMARY

A first aspect provides a method of operating an analytical instrument that comprises a first ion store and a second ion store, wherein the second ion store is arranged downstream of the first ion store, the method comprising: determining whether a target accumulation time for the second ion store is greater than a threshold accumulation time; when it is determined that the target accumulation time is less than the threshold accumulation time: accumulating ions within the second ion store using an accumulation time that is based on the target accumulation time; and when it is determined that the target accumulation time is greater than the threshold accumulation time: accumulating ions within the first ion store using a first accumulation time that is based on a difference between the target accumulation time and the threshold accumulation time, passing the ions accumulated in the first ion store to the second ion store, and accumulating further ions within the second ion store using a second accumulation time that is based on the threshold accumulation time.

Embodiments provide a method of operating an analytical instrument such as a mass spectrometer. The instrument includes a (second) ion store (e.g., ion trap), which may be arranged downstream of an ion source. Ions may be transmitted from the ion source to the second ion store via one or more ion optical devices (and via a first ion store) arranged between the ion source and the second ion store, and may be accumulated within the second ion store, e.g., before being ejected from the second ion store into a mass analyser for analysis. The instrument may include a relatively fast (and relatively precise) ion gate configured to control the accumulation time of ions into the second ion store. The instrument may be operated in a cyclical manner, e.g. such that successive batches of ions are each accumulated in the second ion store, and then passed to and analysed by the mass analyser.

During each instrument cycle, ions may be accumulated in the second ion store according to a target accumulation time for that cycle. The target accumulation time may be determined (e.g., estimated) for each cycle (or for each set of plural cycles) such that accumulating ions for the duration of the target accumulation time will (approximately) provide a desired number of ions that are to be accumulated within the second ion store for that cycle. The desired number of ions may, for example, be below, but as close as possible to, a limit such as a space-charge limit for the second ion store and/or for the mass analyser.

During each instrument cycle, the instrument may be operated both in a mode in which ions are accumulated in the second ion store, and a mode in which ions (do not reach the second ion store and) are not accumulated in the second ion store.

For example, during each instrument cycle, the second ion store may be operated both in an accumulating mode of operation and in a non-accumulating (i.e. closed) mode of operation. It may be necessary to operate the second ion store in its non-accumulating mode for (at least) some minimum amount of time during each cycle, e.g. to allow time for accumulated ions to be processed and/or passed to the mass analyser for analysis, etc.

Additionally or alternatively, during each instrument cycle, one or more of the one or more ion optical devices arranged between the ion source and the second ion store (such as for example a mass filter), may be operated in both a mode in which ions are transmitted to the second ion store (and are accumulated therein), and in a mode in which ions are not transmitted to the second ion store (and so do not reach the second ion store and are not accumulated in the second ion store). For example, during each cycle, a mass filter may be controlled such that (a centre mass to charge ratio (m/z) of) its transmission window is switched between multiple different m/z values. During times in which the transmission window is held at a particular m/z value, ions with mass to charge ratios that correspond to the window's m/z are transmitted by the mass filter. During times in which the mass filter's transmission window is being altered, ions are not transmitted by the mass filter.

As such, during each instrument cycle, the instrument may be operated in a mode in which ions are accumulated in the second ion store for some amount of time that is less than or equal to a maximum accumulation time, where the maximum accumulation time is based on the difference between the total cycle time and the (e.g. necessary) time in which the instrument is operated in a mode (or modes) in which ions (do not reach the second ion store and) are not accumulated in the second ion store.

It can be beneficial in certain experiments to operate the instrument using a relatively high repetition rate. This can the case, e.g., where the instrument is coupled to a separation device such as a liquid chromatography separation device, particularly where the separation device is being operated with a relatively short gradient (e.g. of a few minutes or a few tens of minutes). In this case, operating the instrument using a relatively high repetition rate can allow relatively fast eluting peaks to be properly sampled by the instrument.

However, the inventors have now recognised that when the repetition rate of the instrument is increased, its sensitivity can be significantly decreased. This is because when the repetition rate of the instrument is increased, the time available for each cycle is decreased. However, where the instrument must be operated in a mode (or modes) in which ions are not accumulated in the second ions store for at least some (e.g. fixed) minimum amount of time during each cycle (as described above), increasing the repetition rate necessitates a reduction in the maximum accumulation time available in each cycle. Reducing the maximum accumulation time can in turn reduce the number of ions accumulated within the ion store, and so can reduce the sensitivity of the instrument.

In the methods described herein, a threshold accumulation time is defined for the second ion store. The threshold accumulation time may be based on (e.g. may be equal to or approximately equal to) the maximum accumulation time, i.e. the difference between the total cycle time and the necessary non-accumulating time. The threshold accumulation time could instead be set to a value less than the maximum accumulation time.

When the target accumulation time for the second ion store is less than (or equal to) the threshold accumulation time, ions are accumulated within the second ion store using the target accumulation time, e.g. in the ‘normal’ manner. Thus, the relatively fast (and precise) gate associated with the second ion store is operated in its accumulating (e.g. open) mode for a time based on (e.g. equal to) the target accumulation time (and is otherwise operated in its non-accumulating (e.g. closed) mode), such that ions are directly accumulated within the second ion store for a time based on (e.g. equal to) the target accumulation time.

However, when the target accumulation time for the second ion store is greater than the threshold accumulation time, the accumulation of ions within the second ion store makes use of a first ion store that is arranged within the instrument upstream of (i.e. closer to the ion source than) the second ion store. In particular, ions are initially accumulated within the first ion store using a first accumulation time that is based on (e.g. is equal to or approximately equal to) the difference between the target accumulation time and the threshold accumulation time. That is, ions are “pre-accumulated” within the first ion store. The pre-accumulated ions are then passed from the first ion store to the second ion store. Then, further ions are accumulated directly within the second ion store (i.e. in addition to the pre-accumulated ion) using a second accumulation time that is based on (e.g. is equal to or approximately equal to) the threshold accumulation time. In this way, ions are accumulated within the second ion store for a time based on (e.g. equal to or approximately equal to) the target accumulation time.

Beneficially, pre-accumulating ions in this manner means that the maximum allowable target accumulation time can be increased to be greater than the threshold accumulation time (i.e. greater than the difference between the total cycle time and the necessary non-accumulating time), and e.g. can approach the total cycle time. This in turn means that the repetition rate of the instrument can be increased, without necessitating a significant reduction in sensitivity.

Furthermore, the methods described herein can be implemented in a manner which does not necessitate physical modifications to existing instruments. In embodiments, the first ion store is provided within one of the one or more ion optical devices arranged between the ion source and the second ion store, and makes use of a relatively slow (and relatively imprecise) ion gate that is (already) present in the instrument. For example, the first ion store may be formed within an ion guide (such as a transfer ion guide) of the one or more ion optical devices, and the relatively slow (and relatively imprecise) ion gate may be an exit lens of that ion guide.

Moreover, the inventors have recognised that in these circumstances, it is beneficial to use pre-accumulation of ions within the first ion store only when the target accumulation time exceeds the threshold accumulation time. This means that when the target accumulation time is relatively small, only the relatively fast and precise gate associated with the second ion store is used to control the total accumulation time. The relatively slow and imprecise gate associated with the first ion store is only used when the target accumulation time is relatively long, in which case the error arising from the use of a more imprecise gate is proportionally smaller. Thus, embodiments provide highly accurate control over the number of ions accumulated within the second ion store.

It will be appreciated, therefore, that embodiments provide improved apparatus and methods for mass analysis.

The analytical instrument may be a mass spectrometer, e.g. comprising an ion source. Ions may be generated from a sample in the ion source. The ions may be passed from the ion source to the second ion store via one or more ion optical devices arranged between the ion source and the second ion store.

The one or more ion optical devices may comprise any suitable arrangement of one or more ion guides, one or more lenses, one or more gates, and the like. The one or more ion optical devices may include one or more transfer ions guides for transferring ions, and/or one or more mass selector or filters for mass selecting ions, and/or one or more ion cooling ion guides for cooling ions, and/or one or more collision or reaction cells for fragmenting or reacting ions, and so on. One or more or each ion guide may comprise a multipole ion guide such as a quadrupole ion guide, hexapole ion guide, etc., a segmented multipole ion guide, a stacked ring type ion guide, and the like.

The analytical instrument may comprise one or more mass analysers, which may be arranged downstream of the second ion store. Ions accumulated in the second ion store may be passed to the mass analyser and then analysed by the mass analyser, e.g. so as to determine a mass spectrum of the ions.

The mass analyser(s) can comprise any suitable type(s) of mass analyser, such as in particular an ion trap mass analyser and/or a time-of-flight mass analyser.

Where present, the ion trap mass analyser may be an electrostatic orbital trap mass analyser. The mass analyser may have an inner electrode arranged along an axis and two outer detection electrodes spaced apart along the axis and surrounding the inner electrode. Ions trapped within the mass analyser may oscillate with a frequency which may depend on their mass-to-charge ratio and which can be detected using image current detection. The ions may perform substantially harmonic oscillations along the axis in an electrostatic field whilst orbiting around the inner electrode. The mass analyser may be an Orbitrap™ mass analyser from Thermo Fisher Scientific. Further details of an Orbitrap™ mass analyser can be found, for example, in U.S. Pat. No. 5,886,346.

Where present, the time-of-flight mass analyser may be any suitable type of time-of-flight mass analyser, such as in particular a multireflection time-of-flight mass analyser. Ions within the mass analyser may oscillate between a pair of ion mirrors, until they reach a detector. Ions may travel through the mass analyser with a time-of-flight determined by the mass to charge ratio of the ions. The multireflection time-of-flight mass analyser can optionally be of the tilted-mirror type described in U.S. Pat. No. 9,136,101.

In some embodiments, the instrument includes both an electrostatic ion trap mass analyser, and a time-of-flight mass analyser, e.g. as described in U.S. Pat. No. 10,699,888.

The instrument includes a first ion store and a second ion store, where the second ion store is arranged downstream of (i.e. further away from the ion source than) the first ion store.

The first ion store is arranged downstream of the ion source, and may be configured to receive ions from the ion source. The first ion store may form part of the one or more ion optical devices arranged between the ion source and the second ion store. The first ion store may be formed in an ion guide of the one or more ion optical devices, such as in a transfer ion guide. In particular embodiments, the first ion store is formed in a so-called "bent flatapole" ion guide of the one or more ion optical devices, which may be of the design described in U.S. Pat. No. 9,536,722.

The second ion store is arranged downstream of the ion source, and may be configured to receive ions from the ion source via the one or more ion optical devices (and via the first ion store). The second ion store may be an ion trap. The ion trap may comprise any suitable ion trap, such as a linear ion trap or a curved linear ion trap (C-trap). The ion trap can also be formed from a combination of plural ion traps. The ion trap may be used to cool the accumulated ions prior to injecting them into a mass analyser. The ion trap may be configured such that ions can be ejected from the ion trap to the mass analyser in a pulsed manner.

The ion trap may have an axis and may be operable to eject ions from the ion trap orthogonally to the axis to the mass analyser. An example of a suitable ion trap in the case of injection into an electrostatic orbital trap mass analyser is a curved linear trap (C-Trap), as described for example in WO 2008/081334. Additionally or alternatively, the ion trap may be operable to eject ions from the ion trap in a direction parallel to the axis to the mass analyser. In some embodiments, ions can be ejected either to a first (e.g. electrostatic ion trap) mass analyser, or to a second (e.g. time-of-flight) mass analyser, e.g. as described in U.S. Pat. No. 10,699,888.

The first ion store may be operable in a transmissive mode and in an accumulation mode. In the transmissive mode, ions may pass through the first ion store, without being accumulated within the first ion store. In the accumulation mode, ions may be accumulated within the first ion store, without passing through the first ion store. The second ion store may be operable in an accumulation mode and in a closed (non-accumulating) mode. In the accumulation mode, ions may be accumulated within the second ion store. In the closed mode, ions may be prevented from entering the second ion store, i.e. are not accumulated within the second ion store.

The first ion store may have at least one first gate configured to control an accumulation time of ions in the first ion store. The at least one first gate may be used to control the accumulation time of ions in the first ion store by operating the at least one first gate in an accumulation mode for a desired amount of time, while otherwise operating the at least one first gate in a transmissive mode.

The at least one first gate may comprise a single gate, but it would be possible for the at least one gate to comprise multiple (e.g. two) gates. Where there are multiple gates, there may be an entrance gate and an exit gate. Where the at least one first gate comprises a single gate, operating the first ion store in the transmissive mode may comprise operating the single gate in an open mode, and operating the first ion store in the accumulation mode may comprise operating the single gate in a closed mode.

In particular embodiments, the at least one first gate is an exit lens of a transfer ion guide in which the first ion store is formed. The first ion store may be operated in its transmissive/accumulation modes by applying suitable different voltages to the exit lens, e.g. whereby in the accumulation mode the voltage applied to the exit lens causes ions to become trapped within the ion guide, and in the transmissive mode the voltage applied to the exit lens does not cause ions to be trapped within the ion guide.

The second ion store may have at least one second gate configured to control an accumulation time of ions in the second ion store. The at least one second gate may be used to control the accumulation time of ions in the second ion store by operating the at least one second gate in an accumulation mode for a desired amount of time, while otherwise operating the at least one second gate in a closed mode.

The at least one second gate may comprise a single gate, or multiple (e.g. two) gates. Where there are multiple gates, there may be an entrance gate and an exit gate. Where the at least one second gate comprises a single gate, operating the second ion store in the accumulation mode may comprise operating the single gate in an open mode, and operating the second ion store in the closed mode may comprise operating the single gate in a closed mode. Where the at least one second gate comprises multiple (e.g. two) gates, operating the second ion store in the accumulation mode may comprise operating the entrance gate in an open mode and operating the exit gate in a closed mode; and operating the second ion store in the closed mode may comprise operating the entrance gate in the closed mode.

In particular embodiments, the at least one second gate is a dedicated ion gate configured to accurately control the accumulation time of ions into the second ion store (whereas, as described above, the at least one first gate is an ion guide exit lens). Thus, a response time (i.e. the time taken for the ion gate to go from being fully closed to being fully open (and vice versa)) of the at least one second gate may be faster than a response time of the at least one first gate. For example, the response time of the at least one second gate may be of the order of a few μs or tens of μs, whereas the response time of the response time of the at least one first gate may be of the order of a few hundreds of μs. Thus, the accuracy of the at least one second gate may be greater than the accuracy of the at least one first gate.

The instrument may be operated in a cyclical manner, e.g. such that successive batches of ions are each accumulated in the second ion store and then analysed by the mass analyser. Suitable repetition rates for the instrument may be of the order of a few tens of Hz or a few hundreds of Hz.

As described above, a threshold accumulation time is defined for the second ion store, where the threshold accumulation time may be based on (e.g. may be equal to, approximately equal to, or less than) the difference between the total cycle time for the instrument and a time per cycle in which the instrument is operated in a mode (or modes) in which ions are not (are other than) accumulated in the second ion store.

Modes in which ions are not (are other than) accumulated in the second ion store can include (i) the second ion store's closed (non-accumulating mode), i.e. when accumulated ions are processed and/or passed to the mass analyser for analysis, and/or (ii) a non-transmissive mode of a mass filter arranged upstream of the second ion store, i.e. when the mass filter's m/z window is being altered. Thus, the time per cycle in which the instrument is operated in a mode in which ions are not accumulated in the second ion store can comprise (i) a (e.g. fixed) time per cycle in which the second ion store is operated in a non-accumulating (closed) mode of operation while ions accumulated in the second ion store are processed and/or passed to a mass analyser for analysis, and/or (ii) a time per cycle in which a mass filter is operated in a non-transmitting mode of operation.

When it is determined that the target accumulation time is less than the threshold accumulation time, ions are accumulated within the second ion store using an accumulation time based on the target accumulation time. The accumulation time may be equal to the target accumulation time or may be approximately equal to the target accumulation time (e.g. so as to take into account other instrument delays, switching times, etc.).

When it is determined that the target accumulation time is greater than the threshold accumulation time, ions are accumulated within the first ion store using a first accumulation time that is based on a difference between the target accumulation time and the threshold accumulation time. The first accumulation time may be equal to the difference between the target accumulation time and the threshold accumulation time or may be approximately equal to the difference between the target accumulation time and the threshold accumulation time (e.g. so as to take into account other instrument delays, switching times, etc.).

These accumulated ions are passed to the second ion store, and further ions are then accumulated within the second ion store using a second accumulation time based on the threshold accumulation time. The second accumulation time may be equal to the threshold accumulation time or may be approximately equal to the threshold accumulation time (e.g. so as to take into account other instrument delays, switching times, etc.).

The second accumulation time may immediately follow the first accumulation time, or there may be a (short) delay between the first accumulation time and the second accumulation time, e.g. to allow time for electronics switching and/or ions to be passed to the second ion store. The sum of the second accumulation time and the first accumulation time may be equal to or approximately equal to the target fill time.

In embodiments, accumulating ions within the second ion store using an accumulation time based on the target accumulation time comprises operating the first ion store in its transmissive mode of operation during the accumulation time, such that ions pass through the first ion store during the accumulation time, without being accumulated within the first ion store. Accumulating ions within the second ion store using an accumulation time based on the target accumulation time may also comprise operating the second ion store in its accumulation mode during the accumulation time, such that ions are accumulated within the second ion store during the accumulation time.

Accumulating ions within the first ion store using the first accumulation time may comprise operating the first ion store in its accumulation mode during the first accumulation time, such that ions are accumulated within the first ion store during the first accumulation time.

Passing the ions accumulated in the first ion store to the second ion store may comprise operating the first ion store in its transmissive mode such that ions accumulated in the first ion store are passed to the second ion store. Passing the ions accumulated in the first ion store to the second ion store may also comprise operating the second ion store in its accumulation mode, such that ions passed to the second ion store from the first ion store are accumulated within the second ion store.

Accumulating further ions within the second ion store using the second accumulation time may comprise operating the first ion store in its transmissive mode during the second accumulation time, such that ions pass through the first ion store during the second accumulation time, without being accumulated within the first ion store. Accumulating further ions within the second ion store using the second accumulation time may also comprise operating the second ion store in its accumulation mode during the second accumulation time, such that ions are accumulated within the second ion store during the second accumulation time.

The one or more ion optical devices may include a first mass filter such as a first quadrupole mass filter. In this case, the first ion store may be arranged upstream of the first mass filter. As described above, where the mass filter is controlled such that (a centre mass to charge ratio (m/z) of) its transmission window is switched between multiple different m/z values during each instrument cycle, this allows the first ion store to be used for pre-accumulation during times in which the mass filter's transmission window is being altered, i.e. when ions are not transmitted by the mass filter.

The one or more ion optical devices may also include a second mass filter such as a second quadrupole mass filter. For example, the second mass filter may be a relatively low-resolution "pre-filter", while the first mass filter may be a relatively high-resolution analytical mass filter. In this case, the first ion store may be arranged between the first mass filter and the second mass filter. This allows the second mass filter to be used to perform mass selection of ions entering the first ion store, e.g. to prevent overfilling of the first ion store.

The method may comprise the first mass filter filtering ions according to their mass to charge ratio, wherein the first mass filter filters ions using an isolation window having a width>about 2 Da, >about 3 Da, >about 5 Da, or >about 10 Da. The isolation window may have a width no greater than about 50 Da. The method may comprise fragmenting or reacting the filtered ions, such that the ions accumulated in the second ion store are fragmented ions. The method may comprise passing the fragmented ions accumulated in the second ion store to the mass analyser, and mass analysing the fragmented ions using the mass analyser. Thus, in embodiments, the mass analysis is an MS2 mass analysis. The mass analyser may be an electrostatic ion trap mass analyser, and the mass analysis may be performed using an analyser transient<100 ms, such as 64 ms, or <50 ms, such as 32 ms, 16 ms or 8 ms. The instrument may be operated with a repetition rate>about 10 Hz, >about 20 Hz, >about 40 Hz, >about 60 Hz, or >about 80 Hz.

The method may comprise performing a data independent acquisition (DIA) method, in which a set of MS2 fragmentation spectra are acquired, e.g. in a sweep across an m/z range of interest. Thus, the method may comprise segmenting a mass range of interest into a plurality of precursor mass segments (e.g. with each precursor mass segment having a mass range of no greater than 5 Da), and for each precursor mass segment: (i) fragmenting precursor ions within that precursor mass segment, and (ii) performing an MS2 mass analysis of the fragmented ions by: accumulating the fragmented ions in the second ion store, passing the accumulated fragmented ions to the mass analyser, and mass analysing the fragmented ions.

Each mass analysis may produce a time-varying transient signal. A mass spectrum, such as an MS2 mass spectrum (or an MS1 mass spectrum), may be produced from each time-varying transient signal by deconvolving the transient signal using a deconvolution technique. In particular embodiments, the deconvolution technique is a high-resolution deconvolution technique such as the "phase-constrained spectrum deconvolution method" (also known as ϕSDM), i.e. as described in Grinfeld, et al., "Phase-constrained spectrum deconvolution for Fourier transform mass spectrometry", Anal. Chem., 89 (2): 1202-1211 (2017), and also European Patent Application No. EP 3,086,354 the entire contents of which is incorporated herein by reference.

Thus, in embodiments, the ϕSDM deconvolution technique is applied to relatively short MS2 transient signals, where the instrument is being operated with a relatively high repetition rate. In these circumstances, the pre-accumulation method allows maintenance of duty cycle at low transient lengths thereby mitigating sensitivity losses (as described above), whilst the ϕSDM deconvolution technique recovers the resolution loss resulting from low transient lengths.

As is described in European Patent Application No. EP 3,086,354, in these embodiments, a Fourier transform of the transient signal is performed to produce a first set of complex amplitudes, where each of the complex amplitudes corresponds to a respective frequency of a first set of frequencies. The first set of frequencies may be equally spaced in frequency. A second set of complex amplitudes is generated, where each of these complex amplitudes corresponds to a respective frequency of a second set of frequencies. The second set of frequencies may be equally spaced in frequency. The second set of frequencies may have a spacing (or a minimum spacing) that is less than that of the first set of frequencies. The second set of frequencies may have a spacing (or a minimum spacing) that is less than the inverse of the duration of the transient signal. The second set of complex amplitudes may cover (or span or correspond to) the same frequency range as the first set of complex amplitudes, and so the second set may contain more complex amplitudes than the first set. Hence, the second set of complex amplitudes may provide greater resolution.

The second set of complex amplitudes may be optimized to produce an improved second set of complex amplitudes. At least some of the complex amplitudes from the improved second set may be used to generate the mass spectrum. The improved second set of complex amplitudes may provide a better-quality mass spectrum.

Optimizing the second set of complex amplitudes may comprise varying at least one of the complex amplitudes of the second set based on (or in dependence on) an objective function. For example, the at least one complex amplitudes may be varied with the aim of obtaining a substantially extremum value of the objective function. Optionally, all of the complex amplitudes from the second set may be varied as part of the optimizing step, or a subset may be optimized as part of the optimizing step.

The optimization may be performed subject to a constraint. That is, for at least some of the complex amplitudes of the second set, a constraint may be placed on the phase of each of the at least some complex amplitudes relative to one or more expected phases. The expected phases may be frequency-dependent. The objective function may depend on one or more complex amplitudes of the first set of complex amplitudes and one or more complex amplitudes of the second set of complex amplitudes. The objective function may, for each frequency of the first set of frequencies, relate one or more complex amplitudes of the second set to the respective complex amplitude from the first set (such as by having the objective function a function of the one or more complex amplitudes of the second set and the respective complex amplitude from the first set). The constraint may be applied to all the complex amplitudes of the second set that are being varied as part of the optimizing step, or to a subset of those complex amplitudes.

By generating and optimizing a second set of complex amplitudes, the transient may be thought of as being decomposed onto a finer frequency grid. As the second set of complex amplitudes is not bound to the first set of complex amplitudes as a linear combination of these amplitudes, the resolution increases as the grid spacing of the second set of frequencies decreases. This leads to a much-increased accuracy of the resulting mass spectrum. In other words the ϕSDM method may be thought of as operating with two sets of frequencies. The first set of frequencies may comprise frequencies with a minimum separation of 1/T, where T is the time duration of the transient signal. The second set of frequencies may comprise the frequencies with a minimum separation less than 1/T. The second set of frequencies may contain the first set as a subset. Since the minimum spacing of the second set is less than that of the first set of frequencies, the second set of complex amplitudes may provide greater resolution.

It will be appreciated that by "complex" is to be understood as relating to a number that can be expressed with a real and imaginary part. The imaginary part may be zero i.e. complex as used herein covers real numbers.

One advantage of the ϕSDM method is the integrability of the mass spectrum produced. In other words, the intensity of all peaks, both resolved and unresolved, is conserved. As such, suppression effects of the conventional Fourier transform approach, caused by the interference of adjacent peaks is avoided. Thus the ϕSDM method is of particular benefit where highly accurate intensity information is desired. Moreover, computations can be conducted on shorter transients increasing the speed and throughput of the instrument.

In some embodiments, the step of performing a Fourier transform includes windowing the Fourier-transformed transient signal in the frequency domain, wherein the first set of complex amplitudes correspond to the windowed Fourier-transformed transient signal. This windowing may comprise applying a windowing function to the first set of complex amplitudes. Typically, applying a windowing function includes scaling each complex amplitude of the first set of complex amplitudes by the value of the windowing function at the respective frequency. Additionally, or alternatively, the windowing may comprise discarding the complex amplitudes whose respective frequency is outside of one or more pre-defined ranges. For example, complex amplitudes of the first set of complex amplitudes whose respective frequency is above the Nyquist frequency of the transient signal may be discarded, and/or set to zero.

Advantageously, this may allow an increase in processing speed and reduction of computational burden, as the subsequent processing may be limited to regions of interest only. For a sparse enough spectrum or sparse enough segments of interest, calculations can be carried only within windows of the spectra encapsulating these regions.

A further aspect provides a non-transitory computer readable storage medium storing computer software code which when executed on a processor performs the method(s) described above.

A further aspect provides a control system for an analytical instrument such as a mass spectrometer, the control system configured to cause the analytical instrument to perform the method(s) described above.

A further aspect provides an analytical instrument, such as a mass spectrometer, comprising the control system described above.

A further aspect provides an analytical instrument, such as a mass spectrometer, comprising: a first ion store; a second ion store, wherein the second ion store is arranged downstream of the first ion store; and a control system configured to: determine whether a target accumulation time for the second ion store is greater than a threshold accumulation time; when it is determined that the target accumulation time is less than the threshold accumulation time: cause ions to be accumulated within the second ion store using an accumulation time based on the target accumulation time; and when it is determined that the target accumulation time is greater than the threshold accumulation time: cause ions to be accumulated within the first ion store using a first accumulation time based on a difference between the target accumulation time and the threshold accumulation time, cause the ions accumulated in the first ion store to be passed to the second ion store, and cause further ions to be accumulated within the second ion store using a second accumulation time based on the threshold accumulation time.

These aspects and embodiments can, and in embodiments do, include any one or more or each of the optional features described herein.

DESCRIPTION OF THE DRAWINGS

Various embodiments will now be described in more detail with reference to the accompanying Figures, in which.

DETAILED DESCRIPTION

Figure 1:
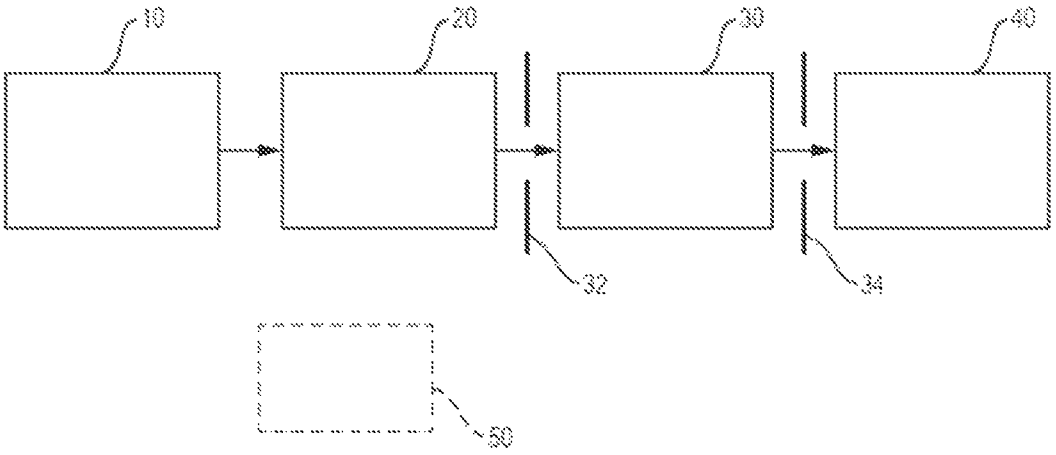
FIG. 1 shows schematically a mass spectrometer that may be operated in accordance with embodiments.

FIG. 1 illustrates schematically a mass spectrometer that may be operated in accordance with embodiments. As shown in FIG. 1, the mass spectrometer includes an ion source 10, one or more ion transfer stages 20, an ion trap 30, and a mass analyser 40.

The ion source 10 is configured to generate ions from a sample. The ion source 10 can be any suitable continuous or pulsed ion source, such as an electrospray ionisation (ESI) ion source, a MALDI ion source, and atmospheric pressure ionisation (API) ion source, a plasma ion source, an electron ionisation ion source, a chemical ionisation ion source, and so on. More than one ion source may be provided and used. The ions may be any suitable type of ions to be analysed, e.g. small and large organic molecules, biomolecules, DNA, RNA, proteins, peptides, fragments thereof and the like.

The ion source 10 may coupled to a separation device such as a liquid chromatography separation device or a capillary electrophoresis separation device (not shown), such that the sample which is ionised in the ion source 10 comes from the separation device.

The ion transfer stage(s) 20 are arranged downstream of the ion source 10 and may include an atmospheric pressure interface and one or more ion guides, lenses and/or other ion optical devices configured such that some or all of the ions generated by the ion source can be transferred from the ion source 10 to the ion trap 30. The ion transfer stage(s) 20 may include any suitable number and configuration of ion optical devices, for example optionally including one or more RF and/or multipole ion guides, one or more ion guides for cooling ions, one or more mass selective ion guides, and so on.

The ion trap 30 is arranged downstream of the ion transfer stage(s) 20 and is configured to receive and accumulate ions from the ion source 10 (via the one or more ion transfer stages 20). The ion trap 30 can comprise any suitable type of ion trap, such as a multipole (e.g. quadrupole) ion trap.

In some embodiments, the ion trap 30 is elongated in an axial direction (thereby defining a trap axis) in which the ions enter the trap. Ions may be trapped radially in the trap by applying RF voltage(s) to trapping (e.g. rod) electrodes of the trap. The ion trap 30 may be or may include a curved linear ion trap (C-Trap), i.e. where the trapping rod electrodes are curved. However, the ion trap 30 may be or may include any other suitable type of ion trap, such as for example a linear ion trap.

The ion trap 30 includes an entrance lens or gate 32 and an exit lens or gate 34. The entrance lens 32 can be operated in an open mode, in which ions (from the ion source 10) can pass the entrance lens and enter the ion trap 30, or a closed mode in which ions (from the ion source 10) cannot pass the entrance lens 32 and do not enter the ion trap 30. When the entrance lens 32 is operated in its closed mode, ions already within the ion trap 30 will not be able to leave the ion trap via the entrance lens 32. Similarly, the exit lens 34 can be operated in an open mode, in which ions can pass the exit lens and leave the ion trap 30, or a closed mode in which ions cannot pass the entrance lens and do not leave the ion trap. The entrance lens 32 (the exit lens 34) can be closed or opened by applying a suitable voltage to the entrance lens 32 (to the exit lens 34).

Ions from the ion source 10 can be accumulated in the ion trap 30 by operating the exit lens 34 in its closed mode, while operating the entrance lens 32 in its open mode. After a desired ion fill time of ions into the ion trap 30, the entrance lens 32 can be closed (by altering the voltage applied to the entrance lens 32) such that ions cannot pass out of the trap 30 and such that ions from the ion source 10 can no longer enter the ion trap 30. Thus, the mass spectrometer is configured such that ions can be accumulated in the ion trap 30 with an adjustable accumulation time (fill time). By controlling the fill time of ions into the trap, where the flux of ions into the trap 30 is known or can be approximated, the total number of ions accumulated in the ion trap 30 can be controlled.

Once accumulated in the ion trap 30, ions within the trap can be ejected into the mass analyser 40. Ions may be ejected from the ion trap 30 in an axial direction, or the ions may be ejected from the trap 30 in a direction orthogonal to the axis of the trap (orthogonal ejection), for example by applying one or more suitable DC voltages to the ion trap 30.

The mass analyser 40 is arranged downstream of the ion trap 30 and is configured to receive ions from the ion trap 30. The mass analyser is configured to analyse the ions so as to determine their mass to charge ratio and/or mass, i.e. to produce a mass spectrum of the ions. The mass analyser 40 may be an ion trap mass analyser, such as an electrostatic orbital trap, and more specifically an Orbitrap™ FT mass analyser as made by Thermo Fisher Scientific. Alternatively, the mass analyser 40 may be a time-of-flight (ToF) mass analyser, such as a multi-reflecting time-of-flight (mr-ToF) mass analyser.

It should be noted that FIG. 1 is merely schematic, and that the mass spectrometer can, and in embodiments does, include any number of one or more additional components. For example, in particular embodiments, the mass spectrometer includes a collision or reaction cell. The instrument may include a single mass analyser, or more than one (e.g. two) mass analysers.

As also shown in FIG. 1, the mass spectrometer is under the control of a control unit 50, such as an appropriately programmed computer, which controls the operation of various components of the spectrometer and, for example, sets the voltages to be applied to the various components of the spectrometer. The control unit 50 may also receive and process data from various components including the detector (s), e.g. perform Fourier transformation on detected signals. The control unit 50 is configured, amongst other things, to determine the settings (e.g. ion trap 30 fill time, etc.) for the injection of ions into the mass analyser 40 for analytical scans.

The mass spectrometer may be operated such that successive batches of ions from the ion source 10 are each analysed by the mass analyser 40. Each batch of ions is firstly accumulated in the ion trap 30, and then the accumulated ions (or e.g. fragment ions derived from the accumulated ions) are injected into the mass analyser 40.

It can be desirable that each batch of ions analysed by the mass analyser 40 includes as many ions as possible, e.g. so as to improve the statistics of the mass spectrum. However, undesirable space charge effects can occur at relatively high ion concentrations and can limit mass resolution and mass accuracy. Therefore, the total number of ions accumulated in the ion trap 30 is controlled to optimise the number of ions injected into the mass analyser 40 to be below, but as close as possible to, a limit for the mass analyser 40 such as a space-charge limit for the mass analyser 40. The total number of ions accumulated in the ion trap 30 may also or instead be controlled to be below a limit for the ion trap 30 such as the space-charge limit for the ion trap 30. Typically, between $5\times10^3$ and $1\times10^6$ elementary charges should be stored, such as between $1\times10^4$ and $1\times10^6$, or between $1\times10^5$ and $5\times10^5$.

However, it may be the case that the flux of ions from the ion source 10 is highly variable. This is particularly the case where the ion source 10 is coupled to a separation device such as a liquid chromatography or capillary electrophoresis device, where the ion flux from the ion source 10 can vary over time by several order of magnitudes.

Therefore, embodiments use so-called automatic gain control (AGC) techniques to precisely control the total number of ions accumulated in the ion trap 30 despite a variable flux of ions into the trap 30. These techniques typically rely on an accurate and reliable real-time estimation of the present ion current or ion flux being received by the ion trap 30. Then, by controlling the filling time T of the ion trap 30, the total number of ions or the total amount of charge accumulated in the trap 30 (and injected into the mass analyser 40) can be suitably controlled.

Thus, for each batch of ions, a target accumulation time T may be determined based on an estimation of the present ion current or ion flux being received by the ion trap 30, and ions may be accumulated in the ion trap 30 for an amount of time equal to the target accumulation time T.

Figure 2:
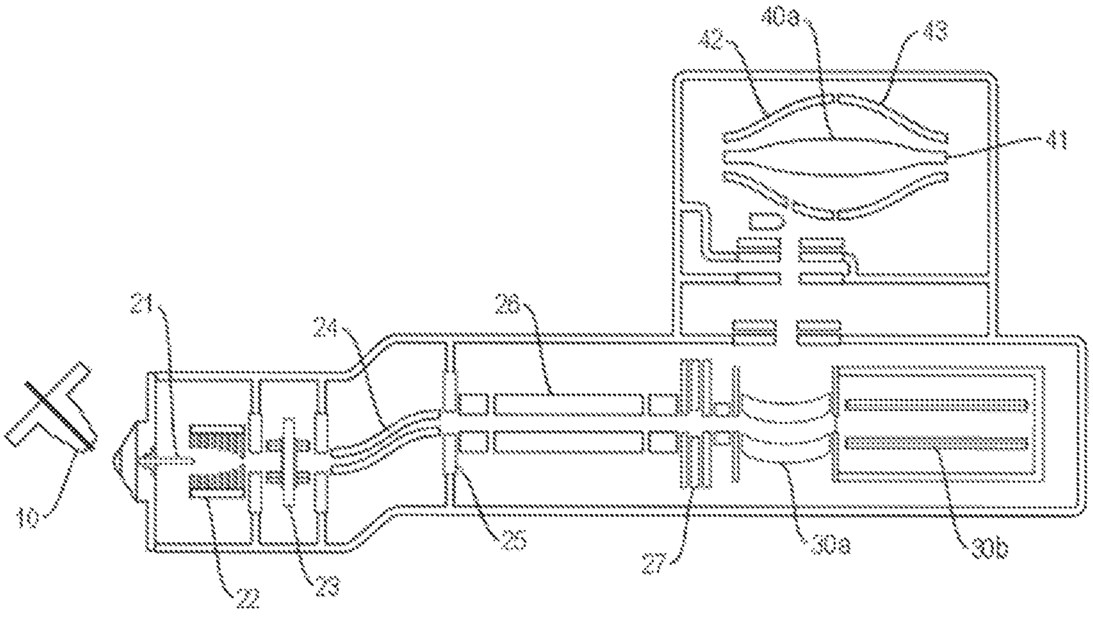
FIG. 2 shows schematically a mass spectrometer that may be operated in accordance with embodiments.
Figure 3:
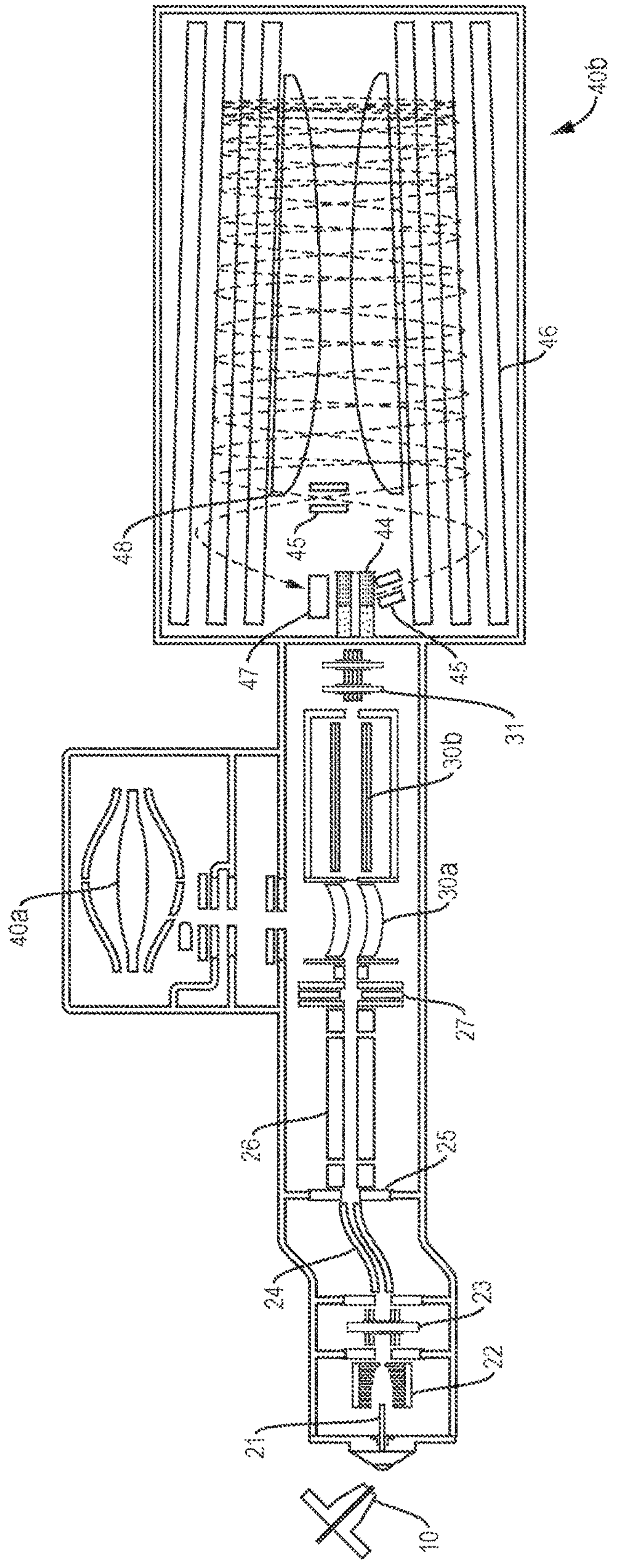
FIG. 3 shows schematically a mass spectrometer that may be operated in accordance with embodiments.

FIGS. 2 and 3 show in more detail two example mass spectrometers that may be operated in accordance with embodiments. It will be understood that the instruments shown in FIGS. 2 and 3 are non-limiting examples, and that numerous variations are possible.

In the embodiment depicted in FIG. 2, the instrument's ion source 10 is an electrospray ionisation (ESI) ion source. The instrument includes a vacuum interface, which includes a transfer tube 21, an ion funnel 22, a quadrupole pre-filter ion guide 23, and a "bent flatapole" ion guide 24. The bent flatapole ion guide 24 may be of the design described in U.S. Pat. No. 9,536,722.

The instrument also includes a mass filter in the form of a quadrupole mass filter 26, an ion trap 30*a* in the form of a curved linear ion trap ("C-Trap"), and a collision cell 30*b* in the form of an ion routing multipole collision cell ("IRM"). Ions from the ion source 10 can be accumulated in the C-Trap 30*a* and/or collision cell 30*b* by opening and closing a gating electrode located in a charge detector assembly 27, which is arranged between the C-Trap 30*a* and the mass filter 26.

The instrument also includes a mass analyser 40*a* in the form of an orbital ion trap mass analyser. As shown in FIG. 2, the orbital trap 40*a* comprises an inner electrode 41 elongated along the orbital trap axis and a split pair of outer electrodes 42, 43 which surround the inner electrode 41 and define therebetween a trapping volume in which ions are trapped and oscillate by orbiting around the inner electrode 41 to which is applied a trapping voltage whilst oscillating back and forth along the axis of the trap. The pair of outer electrodes 42, 43 function as detection electrodes to detect an image current induced by the oscillation of the ions in the trapping volume and thereby provide a detected signal.

The outer electrodes 42, 43 typically function as a differential pair of detection electrodes and are coupled to respective inputs of a differential amplifier (not shown in FIG. 2), which in turn forms part of a digital data acquisition system to receive the detected signal. The detected signal can be processed using Fourier transformation to obtain a mass spectrum of ions within the trap.

Once accumulated in the ion trap 30*a* and/or collision cell 30*b*, ions can be ejected into the mass analyser 40*a*. To do this, the ions may be ejected from the trap 30*a* in a direction orthogonal to the axis of the trap (orthogonal ejection), for example by applying one or more suitable DC voltages to the ion trap 30*a*. The ions may be injected into the mass analyser 40*a* via one or more lenses and a deflector electrode. The mass analyser 40*a* is arranged downstream of the ion trap 30*a* and is configured to receive ions from the ion trap 30*a* (via the one or more lenses and the deflector electrode).

The collision or reaction cell 30*b* is arranged downstream of the ion trap 30*a*. Ions collected in the ion trap 30*a* can either be ejected orthogonally to the mass analyser 40*a* without entering the collision or reaction cell 30*b*, or the ions can be transmitted axially to the collision or reaction cell 30*b* for processing before returning the processed ions to the ion trap 30*a* for subsequent orthogonal ejection to the mass analyser 40*a*. The processing may comprise, for example, fragmenting the ions by collisions with a collision gas and/or a reagent in the collision cell 30*b*, or further cooling the ions by collisions with a gas at lower energies that do cause the ions to fragment.

Turning to FIG. 3, the mass spectrometer depicted in FIG. 3 is substantially similar to the mass spectrometer of FIG. 2. However, the mass spectrometer depicted in FIG. 3 includes an additional time-of-flight (ToF) mass analyser in the form of a multireflection time-of-flight (ToF) mass analyser 40*b*, which has been added to the rear of the instrument. This hybridized instrument is described in more detail in U.S. Pat. No. 10,699,888. In the instrument depicted in FIG. 3, the analyser is of the tilted-mirror type described in U.S. Pat. No. 9,136,101, but it will be understood that any type of ToF analyser could be used.

As shown in FIG. 3, the instrument includes a multipole ion guide 31 to allow ions to be transferred from the collision cell 30*b* to the time-of-flight mass analyser 40*b*. The time-of-flight mass analyser 40*b* includes an extraction trap 44, whereby ions are delivered from the collision cell 30*b* to the extraction trap 44 via the multipole ion guide 31. The ions are accumulated and cooled in the extraction trap 44.

The extraction trap 44 may incorporate two trapping regions, one at a relatively higher pressure for rapid ion cooling, and a second low pressure region for ion extraction. Ions are cooled in the high-pressure region and then transferred to the low-pressure region, where they are pulse ejected into the ToF analyser via a pair of deflectors 45. Ions oscillate between a pair of mirrors 46, which are tilted relative to one another so that the ion path is slowly deflected and redirected back to a detector 47. Correcting stripe electrodes 48 counter the loss of ion focus otherwise induced by the non-parallelism of the mirrors.

Modern mass spectrometers operate with ever faster repetition rates, allowing high performance over shorter experiments and a greater volume of samples to be processed. The main constraints on repetition rate are instrument sensitivity, as a certain accumulation time is required to gather sufficient sample ions for analysis, time required to process these ions for analysis, the analysis time itself, and the time required for electronics to switch between analyte targets.

In the instrument depicted in FIG. 2, ions generated by the electrospray ionisation (ESI) ion source 10 must traverse the vacuum interface, i.e. the transfer tube 21, ion funnel 22, quadrupole pre-filter ion guide 23, and bent flatapole ion guide 24, before being mass selected by the quadrupole mass filter 26, and being accumulated and/or fragmented in the ion trap 30*a* and/or collision cell 30*b*. Ions may then be passed back to the C-Trap 30*a* and pulse-ejected into the mass analyser 40*a* where they are analysed. In conventional operation, at the maximum allowed repetition rate of 40 Hz, or every 25 ms, the maximum accumulation time is only 10 ms, a duty cycle of only 40%.

The longer ions are measured in the mass analyser 40*a* the higher the resolution and the greater the sensitivity of the analyser. For the MS2 (ion fragmentation) measurements that typically dominate most applications, very high resolution is not required but high repetition rate and sensitivity are desirable. Thus, for these measurements, relatively short 16 ms mass analyser transients are often used, giving a resolution of around 7500 at m/z 200. Shorter transients remain viable, but at this point instrument operation overheads and the required ion accumulation time for well resolved spectra set the limit on the instrument's repetition rate to around 40 Hz.

The operation of the instrument may be parallelized to maximise efficiency. Notably, the measurement period of ions in the mass analyser 40*a* itself is very time consuming, and is typically decoupled from the process of loading and processing ions in the C-Trap 30*a* and collision cell 30*b*. A further parallelised stage is the switching of the voltages of the remaining ion optics and the transfer of ions across them to the ion gate.

Figure 4:
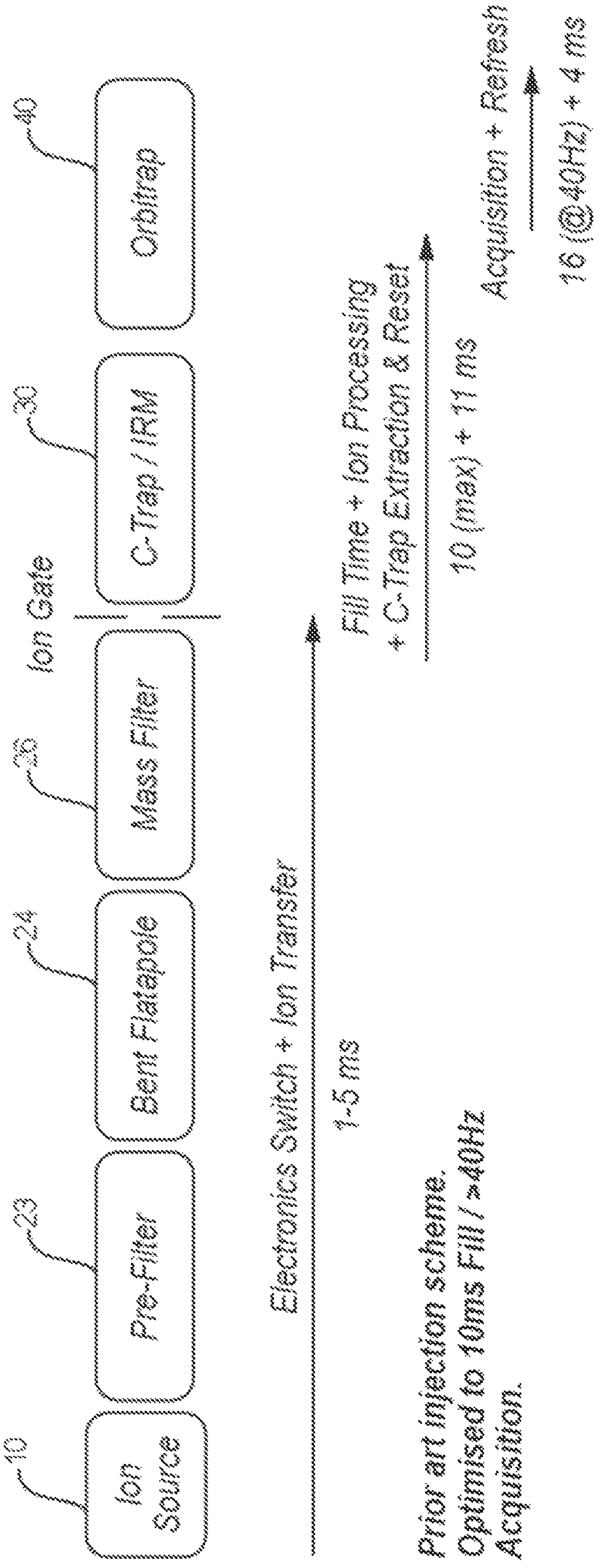
FIG. 4 (Prior Art)
FIG. 4 illustrates a known method of operating the mass spectrometer of FIG. 2 or FIG. 3.

FIG. 4 illustrates these main parallelised operations and their approximate timings. It is notable that the ion accumulation time is entirely coupled with the relatively slow operation of ion processing.

As described above, an important feature of commercial instruments is accurate control of the number of ions injected into the C-Trap 30*a* and mass analyser 40*a*, a process known as automatic gain control (AGC). This is performed by fine control of the fill time by a very fast beam deflecting ion gate within the charge detecting assembly 27 prior to the C-Trap 30*a*. This gate is typically accurate to around 30 μs (or less), although a more advanced dual gate design, e.g. described in U.S. Pat. No. 8,026,475, is accurate to around 1-2 μs. As described above, such precise control is required due to the vast variation in ion beam intensity, and the limited dynamic range of both the C-Trap 30*a* and mass analyser 40*a*.

The inventors now have recognised that a problem with existing instrument designs lies in the relatively poor (<50%) duty cycle when the instrument is operated at relatively high repetition rates. This can lower sensitivity for fast and/or low sample load experiments, and can prevent higher still repetition rates from being accessible. The primary reason for this problem can be seen in FIG. 4. The ion accumulation time is run in series with the C-Trap/IRM ion processing and reset, which are very time-consuming operations, and which block the C-Trap 30*a* for ion accumulation.

Although this problem can be less severe in a time-of-flight instrument, such as the instrument depicted in FIG. 3, these instruments have their own timing issues. In particular, the inventors have recognised that a problem lies in the potentially long time periods for switching the front-end electronics and quadrupole 26 to accommodate different m/z target ions and transfer them through to the C-Trap 30*a*. In the instrument depicted in FIG. 3, transfer and processing of ions in the extraction trap 44 block the trap for a relatively long period, around 3 ms. Combined with around 1 ms to prepare the quadrupole 26, this leaves very little time for ion accumulation at the desired 200 Hz/5 ms repetition rate.

Embodiments address the problem of sensitivity loss at high repetition rates due to restrictions on ion accumulation time imposed by non-parallelisable instrument operations. Specifically, embodiments address the problems associated with the time overhead created by the C-Trap/IRM ion processing and reset sequence, and the m/z target switching and ion transfer time for the instrument front end (i.e. ion funnel/pre-filter/bent flatapole/quadrupole).

In accordance with various embodiments, a parallel ion accumulation stage is added within the one or more ion transfer stages 20. The pre-accumulation stage may be provided within any suitable stage of the one or more ion transfer stages 20. For example, referring to FIGS. 2 and 3, the ion funnel, the pre-filter 23, the bent flatapole ion guide 24, or the mass filter 26 may be operated as a pre-accumulation ion trap. In other instrument designs, equivalent or similar ion transfer stage(s) (e.g. the second part of a dual stage ion funnel) may be used in this manner. The process of pre-accumulating ions may run in parallel to the slow ion processing operations of the C-Trap/IRM assembly. This allows significant additional effective fill time.

With reference to FIGS. 2 and 3, in particular embodiments, the parallel ion accumulation stage is provided within the bent flatapole ion guide 24. The bent flatapole ion guide 24 is particularly suitable for use as a large capacity trapping device, as it incorporates a quadrupole RF trapping field, and a superimposed DC gradient for guiding ions. The bent flatapole 24 also possesses an end-lens 25 that may be voltage switched to act as a crude ion gate.

Because this end lens 25 (or its equivalent in other instrument designs) is a relatively slow device compared to the dedicated ion gate in the charge detecting assembly 27, it can only crudely control ion timings and is thus unsuitable for performing precise AGC with short fill times. Thus, to preserve AGC accuracy, pre-accumulation using the bent flatapole end lens 25 may be disabled if the desired fill time falls below a threshold fill time, e.g. that corresponds to the maximum fill time that the desired repetition rate can support via the prior art accumulation method.

This may be done by defining the fill time through the open ion gate 27 as a primary fill time, and defining the additional fill time within the bent flatapole ion guide 24 as an auxiliary fill time. The total fill time is then allocated to the primary until a maximum (e.g. such as around 10 ms) is reached, and then the remaining time is allocated to the auxiliary. By this means, linearity is maintained, and absolute AGC accuracy is only lost for very long fill times, where this becomes a small proportional loss.

Thus, in embodiments ion accumulation is controlled at two independent places. For the mass spectrometer shown in FIGS. 2 and 3, ion accumulation is already performed in the C-Trap/IRM 30 and controlled by a gating electrode located within the charge detector assembly 27. An additional accumulation stage is implemented for ion accumulation within the bent flatapole 24, and controlled by a voltage applied to the bent flatapole exit lens 25. This extra trapping sequence may be run in parallel to a preceding ion packet being processed within the C-Trap/IRM 30, when ions would otherwise be thrown away and wasted.

Figure 5A:
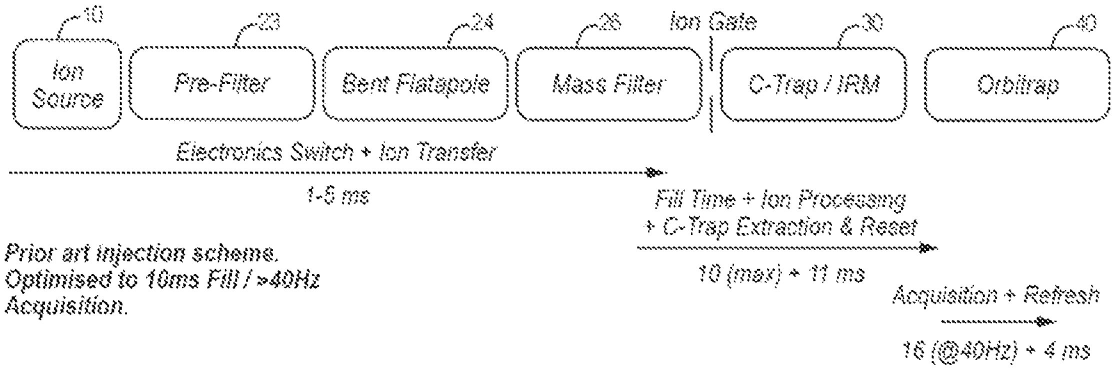
FIG. 5A shows the method of FIG. 4.
Figure 5B:
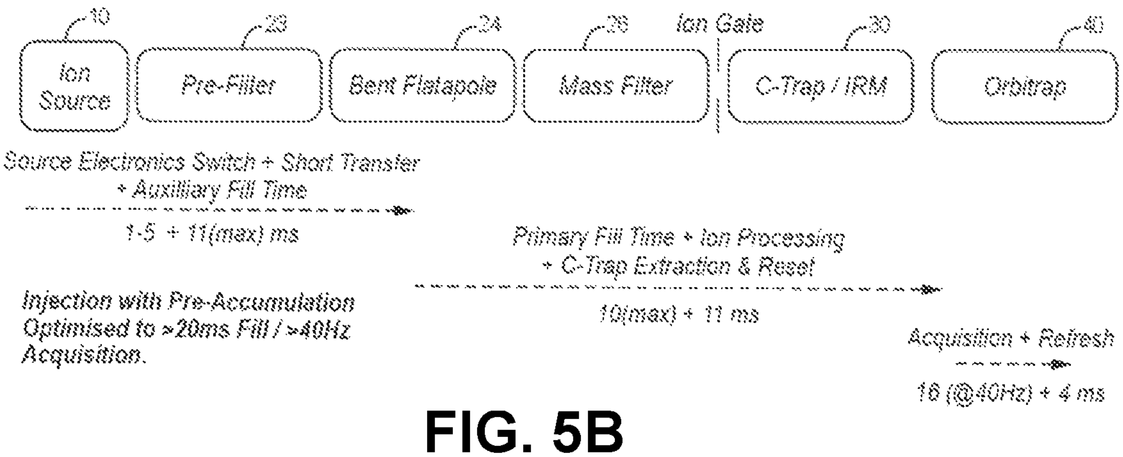
FIG. 5B illustrates a method of operating the mass spectrometer of FIG. 2 or FIG. 3 in accordance with embodiments.
Figure 5C:
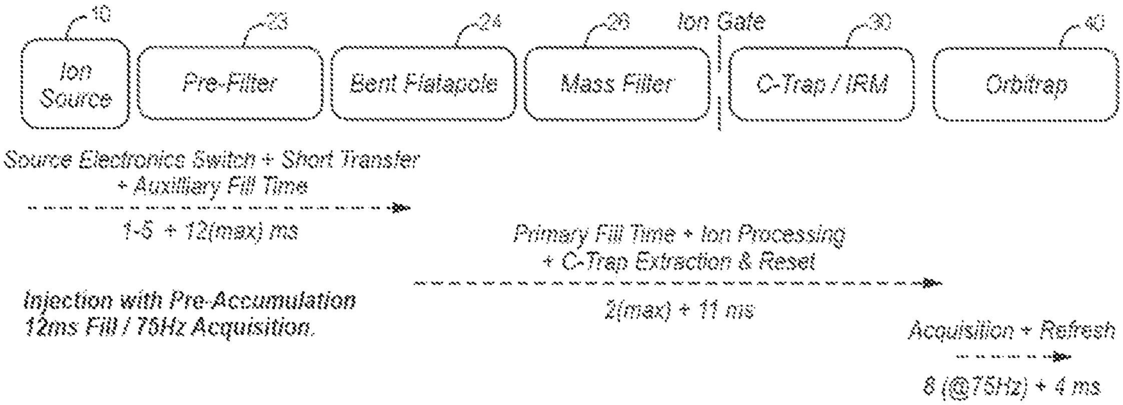
FIG. 5C illustrates a method of operating the mass spectrometer of FIG. 2 or FIG. 3 in accordance with embodiments.

FIGS. 5A-C show a comparison between the prior art operation sequence (FIG. 5A) and the present embodiment (FIG. 5B). Each arrow describes the approximate movement of ions through the instrument in a series of operations, and each parallelized operation series has a separate arrow. It will be understood that FIG. 5 is a simplified description, as the instrument is in reality extremely complex, but adequately shows the most relevant stages. In FIG. 5B, an auxiliary fill time has only been added to the bent flatapole 24. However, as it has been added to the short first stage, there is a lot of free time before this stage equals the other two stages in time and starts to dominate.

It should be noted that a limitation of the depiction of FIG. 5 is that it shows the primary and auxiliary fill times in parallel, when in-fact they draw ions from the same source and in total must be shorter than the overall repetition rate.

FIG. 5C shows alternative timings that become viable using the techniques descried herein. In FIG. 5C, the primary fill time is allowed to shrink down to 2 ms, and the repetition rate increased to around 75 Hz. The unacceptable loss of duty cycle that would occur using the prior art accumulation method is obviated by the relatively long auxiliary fill period.

Beneficially, the pre-accumulation scheme may be seamlessly disabled between scans. As described above, sufficiently accurate control of ion population requires control of fill times down to around 30 μs or less for intense ion currents. However, gating via a lens in accordance with embodiments is much slower than this (and so acts as a less accurate guillotine), typically taking around 100 μs to open/close. Therefore, for intense ion beams with relatively short target fill times, it is desirable not to have any pre-accumulation process at all. In embodiments, where the pre-accumulation is controlled by a secondary fill time preceding the primary fill time, a fill time shorter than the maximum for the primary fill time will give an auxiliary fill time of zero, whereupon the exit lens 25 of the bent flatapole 24 never closes. For fill times exceeding this maximum, an auxiliary fill time may then start to be introduced.

Figure 6:
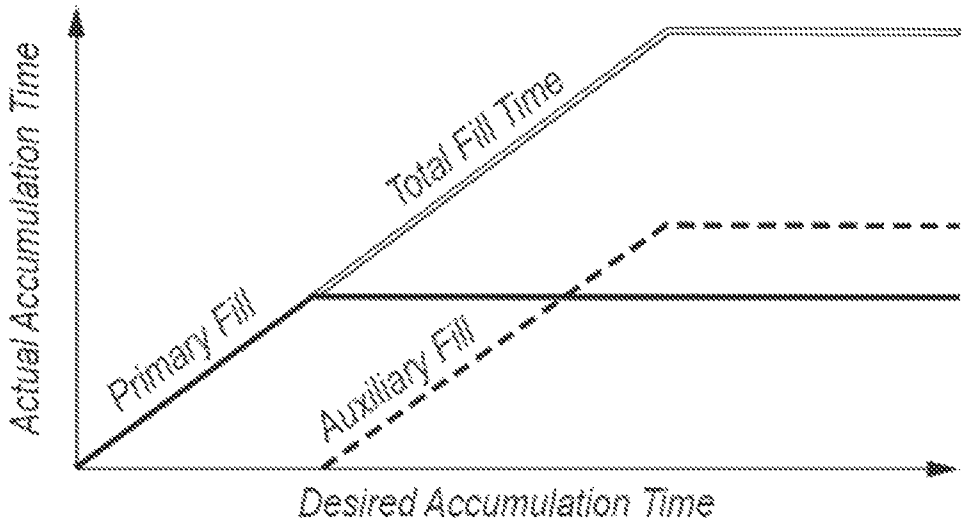
FIG. 6 illustrates a method of operating a mass spectrometer in accordance with embodiments.

FIG. 6 shows this order of precedence for dividing the total ion accumulation time between the primary and auxiliary fills. Essentially, the primary fill should be at or near the maximum before the auxiliary fill is used. In this way, the inaccuracy of the auxiliary fill only affects the measurement of ion current for long accumulations, where the timing error is proportionately small and so will only be a relatively small contributor to the overall error.

Additionally, the linear response of ion load with changing fill time should be maximised with this method. It should be noted, however, that corrections for small errors around the switching point may be provided and used. For example, to take account of the switching time of the bent flatapole exit lens 25, there may need to be a small (e.g. around 100 μs) extra opening time added to its shortest fill times.

Figure 7:
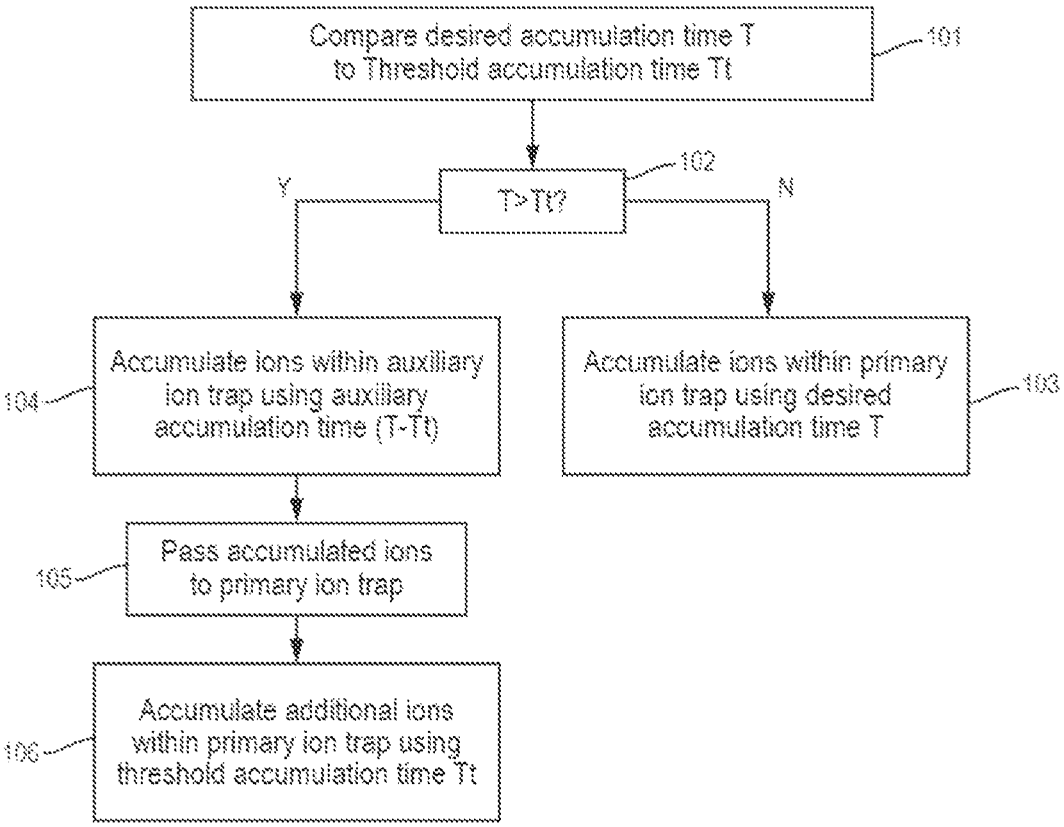
FIG. 7 illustrates a method of operating a mass spectrometer in accordance with embodiments.

FIG. 7 illustrates a method in accordance with embodiments. As shown in FIG. 7, a desired accumulation time T is firstly compared to a threshold accumulation time Tt for the ion trap (step 101), and it is determined whether or not the desired accumulation time T is greater than the threshold accumulation time Tt (step 102). As described above, the threshold accumulation time Tt may be set to be equal to, approximately equal to or less than the difference between the total cycle time for the instrument and a time per cycle in which the instrument is operated in a mode (or modes) in which ions are not (are other than) accumulated in the ion trap 30.

If the desired accumulation time T is less than or equal to the threshold accumulation time Tt, then ions are accumulated in the primary ion trap using the desired accumulation time T (step 103), i.e. in a "normal" manner.

If, however, the desired accumulation time T is greater than the threshold accumulation time Tt, then ions are pre-accumulated in the auxiliary ion trap using an auxiliary accumulation time which is approximately equal to the difference between the desired accumulation time T and the threshold accumulation time Tt (i.e. *T minus* Tt) (step 104). These ions that are accumulated in the auxiliary ion trap are then passed to the primary ion trap (step 105). Finally, additional ions are accumulated in the primary ion trap (to supplement the ions that were accumulated in the auxiliary trap and passed to the primary trap), using an accumulation time approximately equal to the threshold accumulation time Tt (step 106). As such, the total accumulation time for ions is approximately equal to the desired accumulation time, i.e. (T−Tt)+Tt=T.

Returning to FIG. 5, a further advantage of providing the pre-accumulation in an early, pre-mass filter (e.g. bent flatapole 24) stage of the instrument can be seen in how this breaks up the relatively long "electronics switch+ion transfer" stage. Naturally, it takes less time for ions to travel from source 10 to bent flatapole 24 than from source 10 to IRM 30*b*. The electronics switching time may also be improved, if for example the quadrupole electronics are the slowest part, as is the case on existing commercial instruments. This may reduce a stage that commonly takes >4 ms to parallelised stages that only require 1 or 2 ms in total.

Furthermore, in embodiments, the pre accumulation stage is downstream of a pre-filter 23. Advantageously, the pre-filter 23 allows rough mass selection of ions entering the bent flatapole 24, reducing the space charge load presented by unwanted ions, e.g. by around 90%, thus preventing overfilling of the device when running in accumulation mode, which might otherwise also impede the action of the main mass filter 26.

A simple version of the pre-accumulation method was programmed and applied to an Orbitrap™ instrument of the type illustrated in FIG. 2. In this method for all fragmentation spectra, the primary fill time was set to a fixed 10 ms, and the auxiliary fill time set to utilise the remainder of the available time defined by the instrument's repetition rate.

Figure 8:
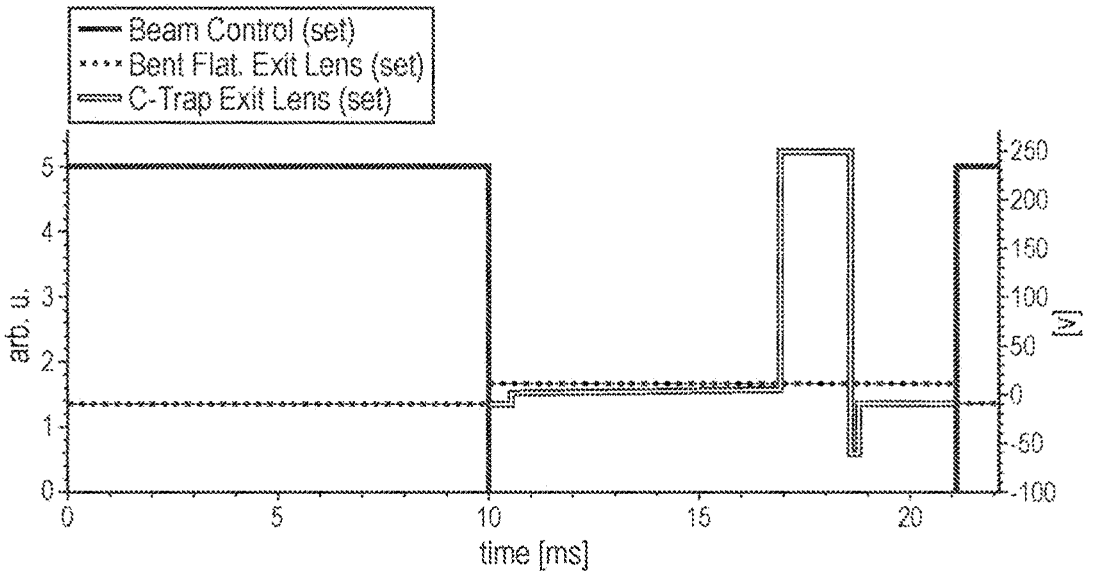
FIG. 8 shows voltages applied to the split lens, bent flatapole exit lens and C-Trap exit lens of the mass spectrometer of FIG. 2 or FIG. 3 when operated in accordance with embodiments.

FIG. 8 illustrates timings of opening and closing the split lens 27 ("Beam Control") and the bent flatapole exit lens 25 which control the primary and secondary accumulation times, together with the timing of the operation of the C-Trap exit lens. As shown in FIG. 8, the moment the primary injection process ("Beam Control") terminates, the bent flatapole exit lens 25 is set from a transmitting voltage of −10V to a trapping voltage of +10V. The voltages applied to the C-Trap exit lens moves from a small negative voltage as ions are loaded to the IRM 30*b* to a slight positive ramped voltage as ions are returned from IRM 30*b* to C-Trap 30*a*. The voltage is then pulsed to +250V at the start of the analyser 40 injection cycle and then set down for reset.

Figure 9:
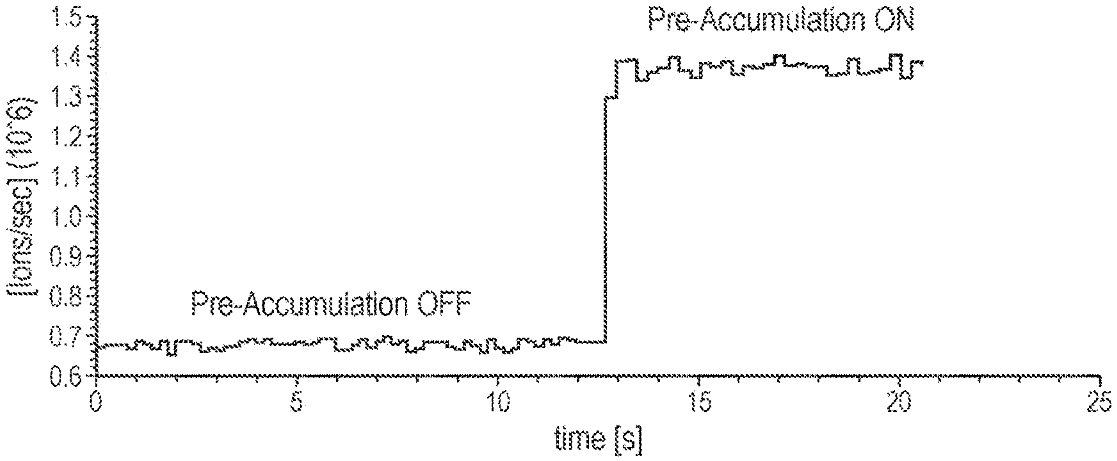
FIG. 9 shows an estimation of the ion current for fluranthene when analysed using the mass spectrometer of FIG. 2 operated with and without the pre-accumulation mode enabled.

FIG. 9 shows an estimation of the ion current for fluranthene with the pre-accumulation mode being switched from disabled to enabled. In FIG. 9, the ion current is estimated from mass analysis measurements using the orbital ion trap mass analyser 40. It can be seen that the ion current roughly doubles, thanks to the doubling of the duty cycle.

Figure 10A:
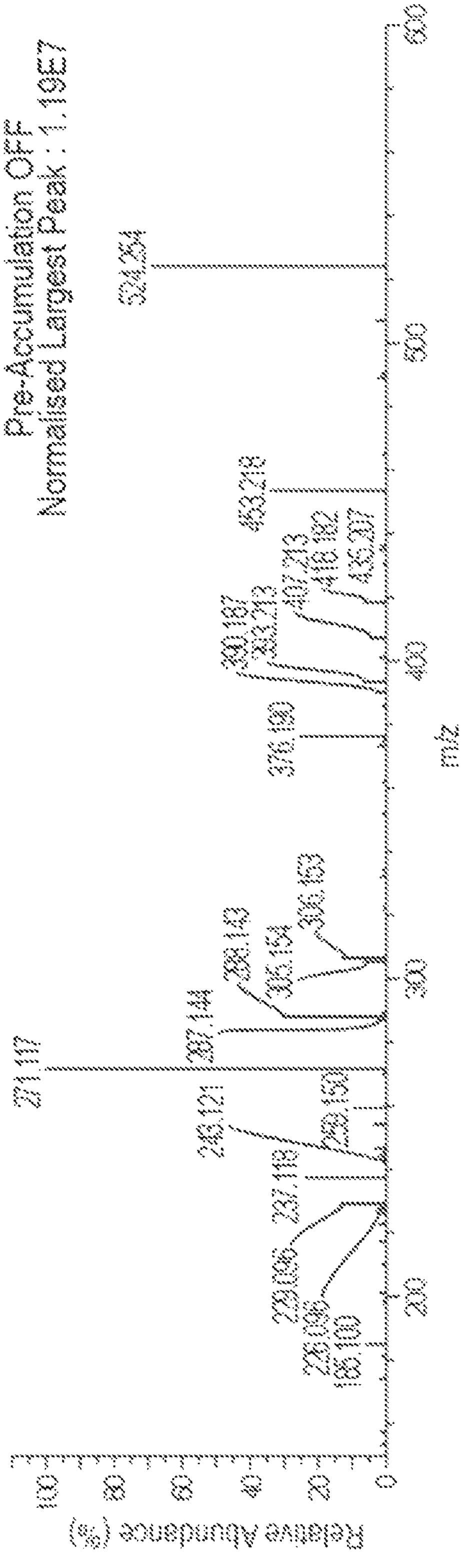
FIG. 10A shows a fragmentation spectrum of an isolated m/z 524 MRFA peptide obtained using the mass spectrometer of FIG. 2 operated with the pre-accumulation mode disabled.
Figure 10B:
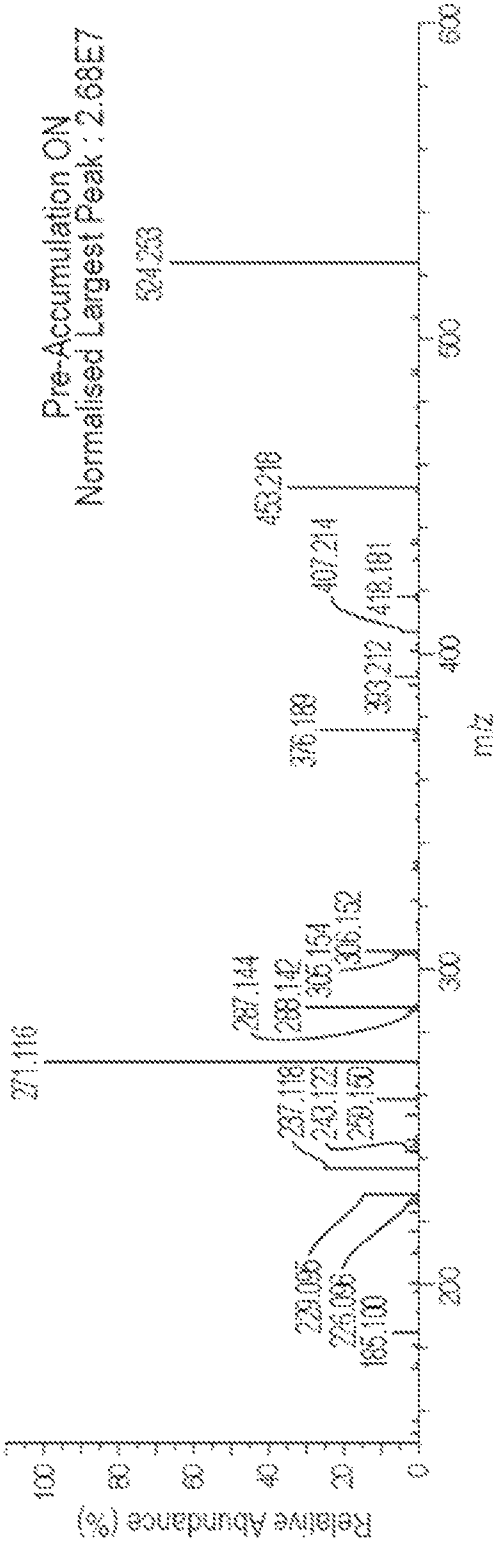
FIG. 10B shows a fragmentation spectrum of the isolated m/z 524 MRFA peptide obtained using the mass spectrometer of FIG. 2 operated with the pre-accumulation mode enabled.

FIGS. 10A-B show fragmentation spectra of an isolated m/z 524 MRFA peptide, with pre-accumulation being set as disabled (FIG. 10A) and enabled (FIG. 10B). It can be seen that both fragment spectra are very similar in terms of the fragment ions present and relative ion abundancies. However, the "normalised largest peak" values, a measurement of ion current for the largest peak, is more than doubled when pre-accumulation is activated due to the increase in duty cycle.

Figure 11:
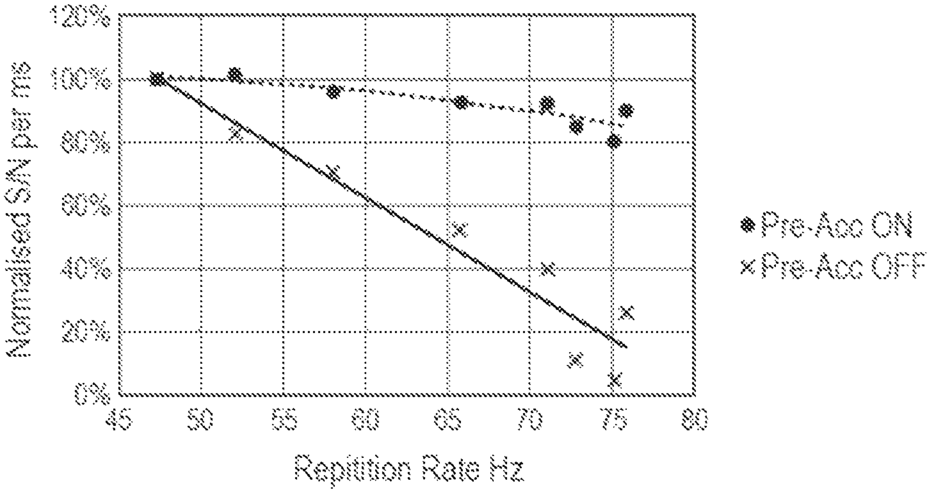
FIG. 11 shows a plot of ion current losses versus repetition rate obtained using the mass spectrometer of FIG. 2 operated with and without the pre-accumulation mode enabled.
Figure 12A:
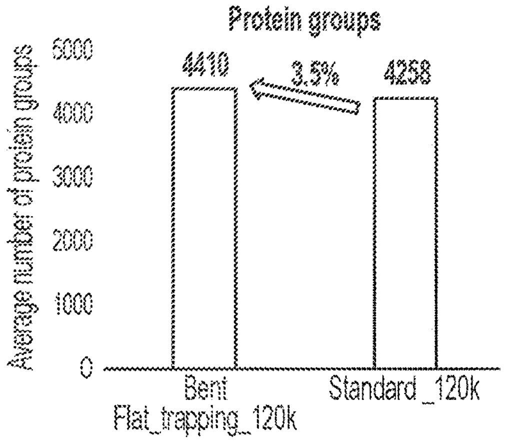
FIGS. 12A-F show head-to-head comparisons of the number of peptides and protein groups identified for a one-hour chromatographic separation of 200 ng HeLa digest obtained using the mass spectrometer of FIG. 2 operated with and without the pre-accumulation mode enabled.
Figure 12B:
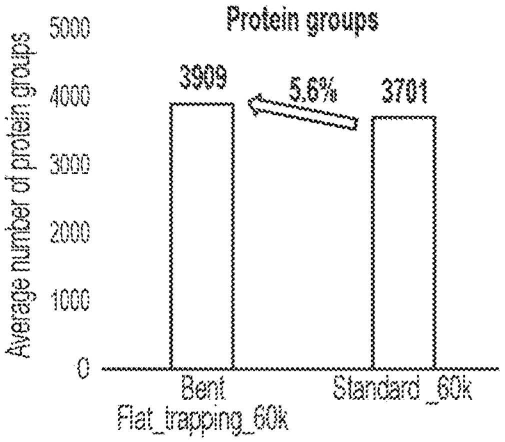
Figure 12C:
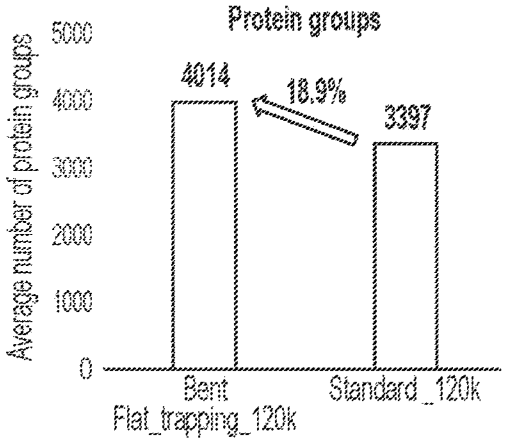
Figure 12D:
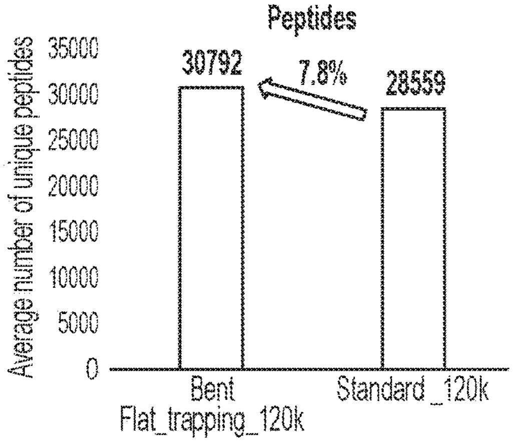
Figure 12E:
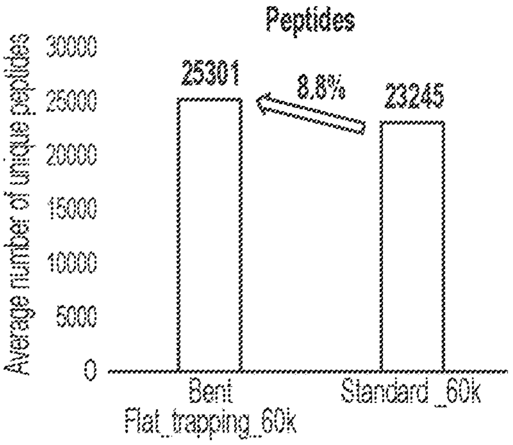
Figure 12F:
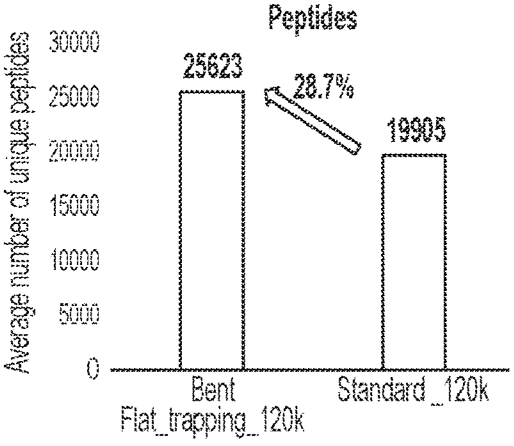

FIG. 11 shows a comparison of ion current losses (normalized to 48 Hz) with repetition rate when the pre-accumulation method is enabled or disabled. The instrument repetition rate was increased by lowering the primary fill time, as described above with respect to FIG. 5C, bringing the cycle time from 21 down to 13 ms. The current of background ions was measured via the estimated total fill time and ion peak signal to noise ratio, allowing an estimation of the change in signal with greater repetition rate.

It can be seen that without pre-accumulation, the sensitivity of the instrument collapses rapidly at high repetition rate, but with pre-accumulation enabled, the sensitivity only loses around 10% of signal above 70 Hz. It is thought that this may relate to the efficiency of purging trapped ions from the bent flatapole 24, and getting them through the quadrupole 26 when only short primary fill times (<3 ms) are used.

FIGS. 12A-F illustrate the pre-accumulation method being used in a proteomics application, in this case a one-hour chromatographic separation of a complex sample, 200 ng HeLa digest, at several different method parameters. FIG. 12 shows head-to-head comparisons of the number of identified peptides and protein groups for the pre-accumulation and standard methods. The data on the left is for the instrument operating with a 120K MS1 and 15K MS2 resolution, and 23 ms fill time. The data in the middle is for the instrument operating with a 60K MS1 and 7.5K MS2 resolution, and 10 ms fill time. The data on the right is for the instrument operating with a 120K MS1 and 7.5K MS2 resolution, and a 10 ms fill time.

Despite these long, high concentration separations being relatively unflattering for this technique (as signal and time are not such desperate limiting factors), the number of identified peptides and protein groups are clearly and consistently increased. In one example, where the MS1 resolution was 120K and MS2 resolution 7.5K, the improvement in peptide identifications was an enormous 29%.

The simple pre-accumulation method was ported to a time-of-flight mass spectrometer of the type shown in FIG. 3. The instrument was operated at 200 Hz with timing overheads of 3 ms, approximately the lower limit for fast precursor switching and ion transfer with a bent-flatapole trapping stage (the lower limit without is even higher, 3.5-4 ms). The remaining 2 ms was set as the ion injection time.

Figure 13A:
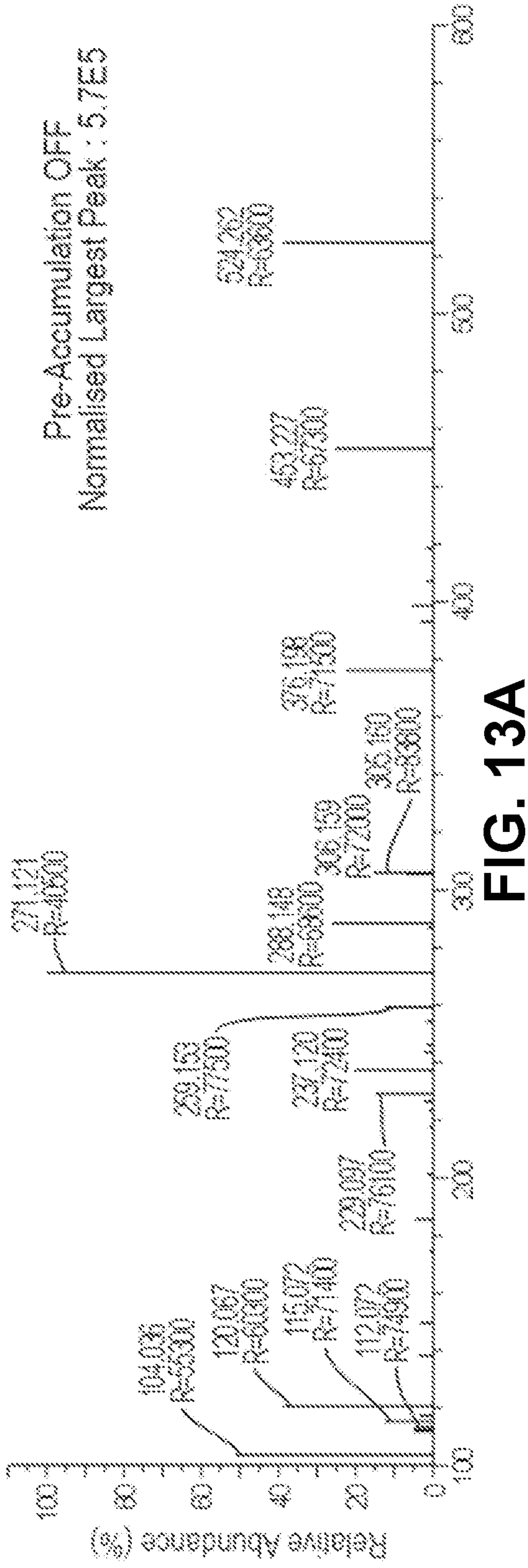
FIG. 13A shows a fragmentation spectrum of the isolated m/z 524 MRFA peptide obtained using the mass spectrometer of FIG. 3 operated at 200 Hz with the pre-accumulation mode disabled.
Figure 13B:
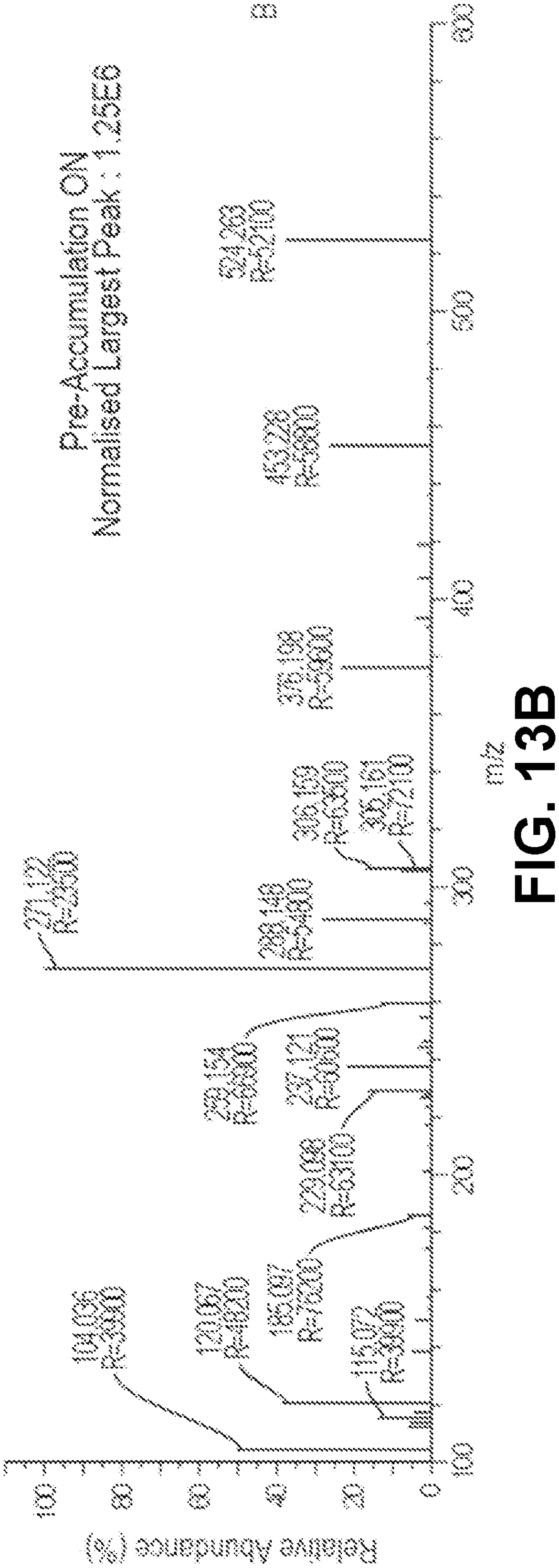
FIG. 13B shows a fragmentation spectrum of the isolated m/z 524 MRFA peptide obtained using the mass spectrometer of FIG. 3 operated at 200 Hz with the pre-accumulation mode enabled.

FIGS. 13A-B show a comparison of signal for fragmented MRFA with and without pre-accumulation. FIG. 13 demonstrates that for these timings, the ion signal is more than doubled when using pre-accumulation. For data independent accumulation, where the precursor selection moves in only small steps, these timing overheads may be reduced to ~1.5 ms and the duty-cycle benefits will be more modest, but still considerable.

It will be appreciated that embodiments relate to the use of two fill times in sequence, an optionally inaccurate one for the pre-accumulation, and an accurate one for the main ion trap (C-Trap/IRM) accumulation. This allows seamless switchable operation where parallelized scans are intermingled with non-parallelized scans for short fill times or for AGC pre-scans, to preserve accurate ion population control and linearity.

Beneficially, this can provide a doubling of instrument sensitivity for fast (e.g. 40 Hz) experiments, and removes a major bottleneck to faster acquisition still, allowing sensitive measurements at up to 75 Hz. With optimization, higher rates still of 80-100 Hz may be attainable. The technique may be applied to existing instruments without hardware changes. The method is particularly suitable for fast, low sample load experiments.

Although various particular embodiments have been described above, various alternative embodiments are possible.

For example, although various embodiments above are described in terms of Obitrap™ instruments, embodiments are applicable to other instrument designs. As described above with reference to FIG. 1, a generalised instrument layout comprises an ion source, interface, gate, trap, and analyser. Pre-accumulation may occur in a part of the interface, or at least before the gate that controls accumulation. In these embodiments, instead of the bent flatapole 24 being used for pre-accumulation, interface ion optical devices may be used, which may include a wide range of multipole ions guides/traps, along with stacked ring, ion funnel or ion carpet type devices.

In these embodiments, the instrument may comprise a mass filter, e.g. between the interface and gate. The mass filter may come before or after the gate, but for the accurate gating to work there must be at least one ion gate separate to the pre-accumulation device. This is present in some q-ToF instruments, which may gate ions prior to accumulation in their collision cell, which then functions as the trap.

The gate may also be integrated into the trap, for example where gating is controlled by the exit lens of a collision cell prior to ToF extraction.

As described above, the "pre-accumulation" method of various embodiments can significantly improve the sensitivity of the analytical instrument. However, a related problem arises in the context of Orbitrap™ analysers, because the sensitivity benefits are most pronounced at relatively high repetition rates, i.e. at relatively short (e.g. 8 ms or 16 ms) Orbitrap™ analyser transients (although at 32 ms the method still provides around a $\frac{1}{3}^{rd}$ increase in ion signal). With these transient lengths, the resolution of the Orbitrap™ analyser is relatively low, in particular 3750 and 7500 at m/z 200, and rapidly drops at higher m/z.

For the Data Dependent Acquisition (DDA) methods described above, the sensitivity gains outweigh the losses incurred from the falling resolution. However, Data Independent Acquisition (DIA) methods are becoming more prominent, particularly at high throughput where they show excellent results. DIA methods are almost never run with 16 ms transients on Orbitrap™ instruments, and instead usually use 32 ms or 64 ms, even for short LC gradients. Whilst sensitivity to low level species is certainly an important consideration in these methods, resolution is a key factor, and 7500 can be too low for some applications. Higher resolution can be necessary to differentiate interfering peaks in complex spectra, and fragment mass accuracy can also be an important factor in these methods at low signal to noise.

Thus, a problem arises due to the relative underperformance of Orbitrap™ analysers in high throughput DIA experiments caused by high resolution and sensitivity requirements limiting repetition rate.

A major advance in Orbitrap™ analyser signal processing has been the development of the so-called "phase-constrained spectrum deconvolution" method, or "ϕSDM", e.g. as described in Grinfeld, et al., Phase-constrained spectrum deconvolution for Fourier transform mass spectrometry, *Anal. Chem.,* 2017, 89, 1202-1211, and also European Patent Application No. EP 3,086,354 the entire contents of which is incorporated herein by reference. Whilst computationally more expensive than the standard "eFT" method, it has the property of multiplying the resolving power for a given transient length, giving more confident assignment of peak abundance and position, and reducing the impact of interfering peaks.

ϕSDM "super resolution" spectral processing has substantial beneficial effects on DIA proteomics experiments in isolation. However, a shortcoming of DSDM alone is that it does nothing to improve the sensitivity of the instrument, and so whilst it provides high resolution at shorter Orbitrap™ analyser transients, in conventional methods the sensitivity still drops off. It is thus poorly compatible with conventional 16 ms and 8 ms transients, where Orbitrap™ analyser duty cycle drops off in addition to the normal reduction in ion accumulation time and signal/noise demanded by the faster repetition rate (as described above). This limitation can be more onerous than the requirement for a large amount of processing power.

In embodiments, the pre-accumulation method described above and the ϕSDM process are combined, in particular for high throughput DIA methods. This combination may also be made for DIA-like DDA methods, e.g. where the isolation window is wide and challenges are similar. The pre-accumulation method allows maintenance of duty cycle at low transient lengths, mitigating sensitivity losses, whilst the ϕSDM technique recovers the resolution loss. Together, the two methods lower the transient floor from 32 ms to 16 ms or even 8 ms, enabling high repetition rates, to even >70 Hz, that are beneficial for high throughput and/or short LC-gradient analyses.

In these embodiments, an Orbitrap™ mass spectrometer such as that shown in FIG. 2 or 3 may be used, coupled to a liquid chromatography device to supply separated sample, typically tryptic digests of biological protein samples. As described above, these instruments typically have a configuration whereby ion accumulation is blocked by the operation of the extraction trap (C-Trap) 30*a*.

As also described above, FIGS. 5B and 5C shows the modified instrument operation sequence and timings for pre-accumulation with 16 ms and 8 ms transients. By injecting ions first into the bent flatapole 24, a second parallel ion accumulation stage is created that may run whilst the C-Trap/IRM 30 is busy. At 40 Hz operation the duty cycle more than doubles, and at 75 Hz increases by five times. Ion trapping and release is controlled by switching the voltage on the bent flatpole exit lens 25, e.g. from +10 to −10V.

Collected Orbitrap™ analyser transient data, either MS and/or MS/MS spectra, may then be analysed via the DSDM technique.

The instrument may operate an otherwise conventional DIA method, whereby a series of pre-accumulation MS/MS fragmentation spectra are taken in a pre-programmed sweep across the mass range, with an optional full MS scan for quantitation of precursors. The full MS scan need not utilise the pre-accumulation technique, but may do so.

The DSDM technique can be applied to MS and/or MS/MS spectra. DSDM using an external processor can slow down the entire system when using long transients, as can be the case for full MS scans. Thus, in some embodiments, the ϕSDM technique is used only for MS/MS scans (and not for MS scans), i.e. so as to maintain speed.

Experiments that can particularly benefit from the combined technique include those that use short LC-gradients, e.g. less than 30 minutes such as 3-15 minutes, where high repetition rates are needed, and those that use substantial sample quantities (e.g. ~50-2000 ng). Very low sample loads (e.g. <10 ng or <1 ng) produce sensitivity issues that the short transients can exacerbate, and are thus often studied with wide isolation windows and long transients. The isolation window similarly should preferably not be very narrow, though down to 2 may be used for DIA. The Orbitrap™ analyser transient length may be around 8-32 ms for MS/MS, so as to provide particular improvements from the combination of pre-accumulation and DSDM. The full-MS Orbitrap™ analyser transient may be longer, e.g. 32-128 ms.

In some embodiments, the DSDM technique may be applied only to particular regions of a spectrum, such as particularly congested regions of the spectrum, e.g. the precursor region, or areas with low signal/noise peaks that would benefit from greater mass accuracy. In this case, a regular profile spectrum may first be generated, and interrogated for regions to apply ϕSDM to. Such a filter may help to reduce the computational load of the method.

It will be appreciated that the combination of the pre-accumulation method and the ϕSDM technique make Orbitrap™ instruments compatible with short transients and thus fast DIA experiments. This benefit is synergistic, as the two must be used together to work. Conventional Orbitrap™ instruments are typically unsuited to high scan rates, especially for DIA experiments, due to loss of duty cycle, signal and commensurate loss of resolution causing interferences between closely spaced peaks. By applying the pre-accumulation method, the duty cycle problem is solved, but the resolution is still reduced. However, applying the ϕSDM technique recovers this to normal, suitable, levels.

It will be understood that there may still be a loss of ion accumulation time due to the shorter transient, however for short LC-gradients this is less of a problem as ion current is normally considerably higher.

Although these embodiments are particularly suited to DIA methods, they may also be of benefit for high throughput DDA, where the isolation window is sufficiently wide that spectra are complex, and resolution becomes important.

Other similar high resolution deconvolution techniques may be used in the same way, such as for example, the Least Squares Fit method, i.e. as described in the article Kozhinov, et al., (2022), "Super-resolution mass spectrometry enables rapid, accurate, and highly-multiplexed proteomics at the MS2-level", bioRxiv. This techniques reports some similarities in properties and performance to DSDM.

Although the present invention has been described with reference to various embodiments, it will be understood that various changes may be made without departing from the scope of the invention as set out in the accompanying claims.

The invention claimed is:

1. A method of operating an analytical instrument that comprises a first ion store and a second ion store arranged downstream of the first ion store, the method comprising:

determining whether a target accumulation time for the second ion store is greater than a threshold accumulation time;

when it is determined that the target accumulation time is less than the threshold accumulation time: accumulating ions within the second ion store using an accumulation time based on the target accumulation time; and when it is determined that the target accumulation time is greater than the threshold accumulation time: accumulating ions within the first ion store using a first accumulation time based on a difference between the target accumulation time and the threshold accumulation time, passing the ions accumulated in the first ion store to the second ion store, and accumulating further ions within the second ion store using a second accumulation time based on the threshold accumulation time.

2. The method of claim 1, wherein the instrument comprises at least one first gate configured to control an accumulation time of ions in the first ion store, and at least one second gate configured to control an accumulation time of ions in the second ion store, wherein a response time of the at least one second gate is faster than a response time of the at least one first gate.

3. The method of claim 1, wherein the instrument comprises an ion source and one or more ion optical devices arranged between the ion source and the second ion store, wherein the one or more ion optical devices are configured to transmit ions from the ion source to the second ion store, and wherein the first ion store is arranged within the one or more ion optical devices.

4. The method of claim 3, wherein the first ion store is formed in a transfer ion guide of the one or more ion optical devices.

5. The method of claim 1, wherein the instrument includes a first mass filter arranged upstream of the second ion store, and wherein the first ion store is arranged upstream of the first mass filter.

6. The method of claim 5, wherein the instrument includes a second mass filter arranged upstream of the first mass filter, wherein a resolution of the second mass filter is less than a resolution of the first mass filter, and wherein the first ion store is arranged between the first mass filter and the second mass filter.

7. The method of claim 5, further comprising the first mass filter filtering ions according to their mass to charge ratio, wherein the first mass filter filters ions using an isolation window having a width>about 2 Da.

8. The method of claim 1, wherein the instrument comprises a mass analyser arranged downstream of the second ion store, and wherein the method comprises passing ions accumulated in the second ion store to the mass analyser, and analysing the ions using the mass analyser.

9. The method of claim 8, wherein the mass analyser analysing the ions produces a time-varying transient signal, and wherein the method further comprises producing a mass spectrum from the time-varying transient signal using a phase-constrained spectrum deconvolution method (@SDM).

10. The method of claim 9, wherein the time-varying transient signal has a duration<50 ms.

11. The method of claim 1, wherein the instrument is operated in a cyclical manner, and wherein the threshold accumulation time is based on a difference between a total cycle time for the instrument and a time per cycle in which the instrument is operated in a mode in which ions are other than accumulated in the second ion store.

12. The method of claim 11, wherein the time per cycle in which the instrument is operated in the mode in which ions are other than accumulated in the second ion store comprises a time per cycle in which the second ion store is operated in a non-accumulating mode of operation while ions accumulated in the second ion store are processed and/or passed to a mass analyser for analysis.

13. The method of claim 11, further comprising operating the instrument with a repetition rate>20 Hz, >40 Hz, >60 Hz, or >80 Hz.

14. The method of claim 1, wherein accumulating ions within the second ion store using an accumulation time based on the target accumulation time comprises:

operating the first ion store in a transmissive mode of operation during the accumulation time, such that ions pass through the first ion store during the accumulation time, without being accumulated within the first ion store; and operating the second ion store in an accumulation mode during the accumulation time, such that ions are accumulated within the second ion store during the accumulation time.

15. The method of claim 1, wherein accumulating ions within the first ion store using the first accumulation time comprises:

operating the first ion store in an accumulation mode during the first accumulation time, such that ions are accumulated within the first ion store during the first accumulation time.

16. The method of claim 1, wherein passing the ions accumulated in the first ion store to the second ion store comprises:

operating the first ion store in transmissive mode such that ions accumulated in the first ion store are passed to the second ion store; and operating the second ion store in an accumulation mode, such that ions passed to the second ion store from the first ion store are accumulated within the second ion store.

17. The method of claim 1, wherein accumulating further ions within the second ion store using the second accumulation time comprises:

operating the first ion store in a transmissive mode during the second accumulation time, such that ions pass through the first ion store during the second accumulation time, without being accumulated within the first ion store; and operating the second ion store in an accumulation mode during the second accumulation time, such that ions are accumulated within the second ion store during the second accumulation time.

18. The method of claim 1, wherein when it is determined that the target accumulation time is equal to the threshold accumulation time, the method comprises accumulating ions within the second ion store using an accumulation time based on the target accumulation time.

19. A non-transitory computer readable storage medium storing computer software code which when executed on a processor causes an analytical instrument that comprises a first ion store and a second ion store arranged downstream of the first ion store to perform the steps of:

determining whether a target accumulation time for the second ion store is greater than a threshold accumulation time;

when it is determined that the target accumulation time is less than the threshold accumulation time: accumulating ions within the second ion store using an accumulation time based on the target accumulation time; and when it is determined that the target accumulation time is greater than the threshold accumulation time: accumulating ions within the first ion store using a first accumulation time based on a difference between the target accumulation time and the threshold accumulation time, passing the ions accumulated in the first ion store to the second ion store, and accumulating further ions within the second ion store using a second accumulation time based on the threshold accumulation time.

20. An analytical instrument, such as a mass spectrometer, comprising:

a first ion store;

a second ion store, wherein the second ion store is arranged downstream of the first ion store; and a control system configured to:

determine whether a target accumulation time for the second ion store is greater than a threshold accumulation time;

when it is determined that the target accumulation time is less than the threshold accumulation time: cause ions to be accumulated within the second ion store using an accumulation time based on the target accumulation time; and when it is determined that the target accumulation time is greater than the threshold accumulation time: cause ions to be accumulated within the first ion store using a first accumulation time based on a difference between the target accumulation time and the threshold accumulation time, cause the ions accumulated in the first ion store to be passed to the second ion store, and cause further ions to be accumulated within the second ion store using a second accumulation time based on the threshold accumulation time.

* * * * *